(12) United States Patent
Zhao et al.

(10) Patent No.: US 11,349,976 B2
(45) Date of Patent: May 31, 2022

(54) INFORMATION PROCESSING METHOD, FILE TRANSMISSION METHOD, ELECTRONIC APPARATUS, AND COMPUTING APPARATUS

(71) Applicant: Lenovo (Beijing) Co., Ltd., Beijing (CN)

(72) Inventors: Rui Zhao, Beijing (CN); Yue Cao, Beijing (CN); Yao Sun, Beijing (CN); Dan Song, Beijing (CN); Lei Zhang, Beijing (CN); Shiguang Huang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/018,832

(22) Filed: Sep. 11, 2020

(65) Prior Publication Data

US 2021/0084136 A1 Mar. 18, 2021

(30) Foreign Application Priority Data

Sep. 12, 2019 (CN) .......................... 201910870232.5
Sep. 12, 2019 (CN) .......................... 201910870235.9
Sep. 12, 2019 (CN) .......................... 201910873664.1

(51) Int. Cl.
*H04M 1/72412* (2021.01)
*G06F 3/14* (2006.01)
(Continued)

(52) U.S. Cl.
CPC ...... *H04M 1/72412* (2021.01); *G06F 3/0485* (2013.01); *G06F 3/04883* (2013.01); *G06F 3/1454* (2013.01); *H04L 67/06* (2013.01)

(58) Field of Classification Search
CPC .. G06F 3/0485; G06F 3/04883; G06F 3/1454; H04M 17/72412; H04M 1/72412; H04L 67/06
See application file for complete search history.

(56) References Cited

U.S. PATENT DOCUMENTS 8,565,819 B2 * 10/2013 Zhang .................. G06F 3/1454
455/557
2012/0038678 A1 * 2/2012 Hwang ................. G06F 3/1454
345/667

(Continued)

FOREIGN PATENT DOCUMENTS

CN 104077074 A 10/2014
CN 105512086 A 4/2016

(Continued)

*Primary Examiner* — Tadesse Hailu
(74) *Attorney, Agent, or Firm* — Anova Law Group, PLLC

(57) ABSTRACT

An information processing method includes establishing a connection between a first electronic device and a second electronic device; receiving display data through a first transmission channel, the display data corresponding to a display image of the second electronic device; displaying the display image in a first display area of the first electronic device; and receiving first input information and second input information. The method further includes converting the second input information into a control instruction; if the first input information being in the first display area: converting the first input information into conversion information and transmitting the conversion information and the control instruction through a second transmission channel to cause the second electronic device to respond to the control instruction; and if the first input information being in a second display area, responding to the control instruction based on the first input information by the first electronic device.

9 Claims, 14 Drawing Sheets

(51) Int. Cl.
  *H04L 67/06* (2022.01)
  *G06F 3/0485* (2022.01)
  *G06F 3/04883* (2022.01)

(56) References Cited

U.S. PATENT DOCUMENTS

| | | | |
|---|---|---|---|
| 2013/0027289 A1* | 1/2013 | Choi | H04N 21/41265 345/156 |
| 2013/0278484 A1* | 10/2013 | Hwang | G06F 3/1423 345/2.3 |
| 2014/0057565 A1* | 2/2014 | Kim | G06F 3/1454 455/41.2 |
| 2014/0101574 A1* | 4/2014 | Maynard | G06F 3/1423 715/761 |
| 2014/0168066 A1* | 6/2014 | Deng | G06F 3/0486 345/156 |
| 2014/0282086 A1* | 9/2014 | Shi | H04N 21/4316 715/752 |
| 2015/0106866 A1* | 4/2015 | Fujita | G06F 3/1454 725/133 |
| 2015/0154781 A1* | 6/2015 | Takanashi | G06F 3/1438 345/629 |
| 2016/0098099 A1* | 4/2016 | Cho | G06F 3/1454 345/157 |
| 2016/0198342 A1* | 7/2016 | Kim | H04L 63/18 455/411 |
| 2016/0216852 A1* | 7/2016 | Lee | G06F 3/04842 |
| 2016/0253142 A1* | 9/2016 | Choi | G06F 3/1454 345/1.3 |
| 2016/0349946 A1* | 12/2016 | Koh | G06F 3/0482 |
| 2017/0017454 A1* | 1/2017 | Kim | G06F 3/04842 |
| 2017/0078740 A1* | 3/2017 | Iwami | H04N 21/43637 |
| 2017/0351531 A1* | 12/2017 | Li | G06F 3/1423 |
| 2018/0151150 A1 | 5/2018 | Volpi et al. | |
| 2018/0275948 A1* | 9/2018 | Xu | G06F 3/1454 |

FOREIGN PATENT DOCUMENTS

| | | |
|---|---|---|
| CN | 106095084 A | 11/2016 |
| CN | 106354451 A | 1/2017 |
| CN | 107493375 A | 12/2017 |
| CN | 108228125 A | 6/2018 |
| CN | 108282677 A | 7/2018 |
| CN | 108415679 A | 8/2018 |
| CN | 108491131 A | 9/2018 |
| CN | 108874342 A | 11/2018 |
| CN | 108900697 A | 11/2018 |
| CN | 108932144 A | 12/2018 |
| CN | 208367339 U | 1/2019 |
| CN | 109739450 A | 5/2019 |
| CN | 109857321 A | 6/2019 |
| CN | 110109636 A | 8/2019 |
| CN | 110121158 A | 8/2019 |
| CN | 110147199 A | 8/2019 |
| EP | 2224325 A1 | 9/2010 |

\* cited by examiner

INFORMATION PROCESSING METHOD, FILE TRANSMISSION METHOD, ELECTRONIC APPARATUS, AND COMPUTING APPARATUS

CROSS-REFERENCES TO RELATED APPLICATIONS

This application claims priority to Chinese Patent Application No. 201910870232.5, filed on Sep. 12, 2019, Chinese Patent Application No. 201910870235.9, filed on Sep. 12, 2019, and Chinese Patent Application No. 201910873664.1, filed on Sep. 12, 2019, the entire contents of all of which are incorporated herein by reference.

TECHNICAL FIELD

The present disclosure generally relates to an information processing method, a file transmission method, an electronic device, and a computing device.

BACKGROUND

Smartphones are widely used in people's daily life. To demonstrate the content on the smartphone, screen projection technology is often used to project the image on the smartphone on a large screen of an electronic device.

When performing an operation on the projected interface of the smartphone at a computer terminal, a user uses a mouse to simulate an existing interactive gesture of the smartphone. After sending the simulated gesture to the smartphone, the smartphone executes the gesture to implement the operation on the projected interface. However, some existing interactive gestures (e.g., selecting all on the page, selecting text, etc.) of the smartphone are difficult to simulate by using the mouse. These gestures are realized through complex mouse click operations, which provides poor user experience.

The user may also need to transmit a file between the smartphone and the computer. The user can connect the smartphone and the computer through a data cable to transmit the file, which is not convenient. Therefore, it is desirable to improve the file transmission method between two electronic devices to simplify user operations.

Further, an electronic device, such as a computer, provides a plurality of functions. For example, the electronic device can display a current interface of another device, such as a smartphone. That is, a smartphone may project its current interface onto a computer. However, the related technology does not consider the interactions between the two devices. As such, the interactions between the electronic device and the other device often do not meet the user's requirements and deliver poor user experience.

SUMMARY

Embodiments of the present disclosure provide an information processing method. The method includes establishing a connection between a first electronic device and a second electronic device; receiving display data through a first transmission channel, the display data corresponding to a display image of the second electronic device; displaying the display image in a first display area of the first electronic device; and receiving first input information and second input information. The method further includes converting the second input information into a control instruction; if the first input information being in the first display area: converting the first input information into conversion information and transmitting the conversion information and the control instruction through a second transmission channel to cause the second electronic device to respond to the control instruction; and if the first input information being in a second display area, responding to the control instruction based on the first input information by the first electronic device.

Embodiments of the present disclosure provide an information processing method. The method includes receiving, by a first electronic device, display data from a second electronic device, the display data corresponding to an image frame and being dynamically updated; determining an output method; and displaying the image frame based on the determined output method and the display data on the first electronic device. If the output method is a first output method, at least a first control component and a first image frame are displayed based on first display data. If the output method is a second output method, a second image frame is displayed based on second display data. The second image frame includes at least a second control component. A result of triggering the first control component is consistent with a result of triggering the second control component.

Embodiments of the present disclosure provide an information processing method. The method includes connecting a first electronic device to a second electronic device; receiving display data from the second electronic device through a first transmission channel, the display data corresponding to a display image of the second electronic device; displaying the display image in a first display area of the first electronic device; receiving an input operation, including an input position and an input gesture; and if the input operation indicates a first input operation of moving a first file into a first display area, transmitting the first file corresponding to the first input operation to a second electronic device through a second transmission channel.

Embodiments of the present disclosure provide an electronic device, including a screen, a processor, and a memory. The memory stores a computer executable instruction that, when executed by the processor, causes the processor to establish a connection between the electronic device and a second electronic device; receive display data through a first transmission channel, the display data corresponding to a display image of the second electronic device; display the display image in a first display area of the electronic device; and receive first input information and second input information. The processor is further caused to convert the second input information into a control instruction; if the first input information is in the first display area: convert the first input information into conversion information and transmit the conversion information and the control instruction through a second transmission channel to cause the second electronic device to respond to the control instruction based on the conversion information; and if the first input information is in a second display area, respond to the control instruction based on the first input information by the electronic device.

Embodiments of the present disclosure provide an electronic device, including a screen, a processor, and a memory. The memory stores a computer executable instruction that, when executed by the processor, causes the processor to receive, by the electronic device, display data from a second electronic device, the display data corresponding to an image frame and being dynamically updated; determine an output method; and display the image frame based on the determined output method and the display data on the electronic device. If the output method is a first output method, display at least a first control component and displaying a first image frame based on first display data; and if the output method is a second output method, display a second image frame based on second display data. The second image frame includes at least a second control component. A result of triggering the first control component is consistent with a result of triggering the second control component.

DETAILED DESCRIPTION OF THE EMBODIMENTS

Figure 1:
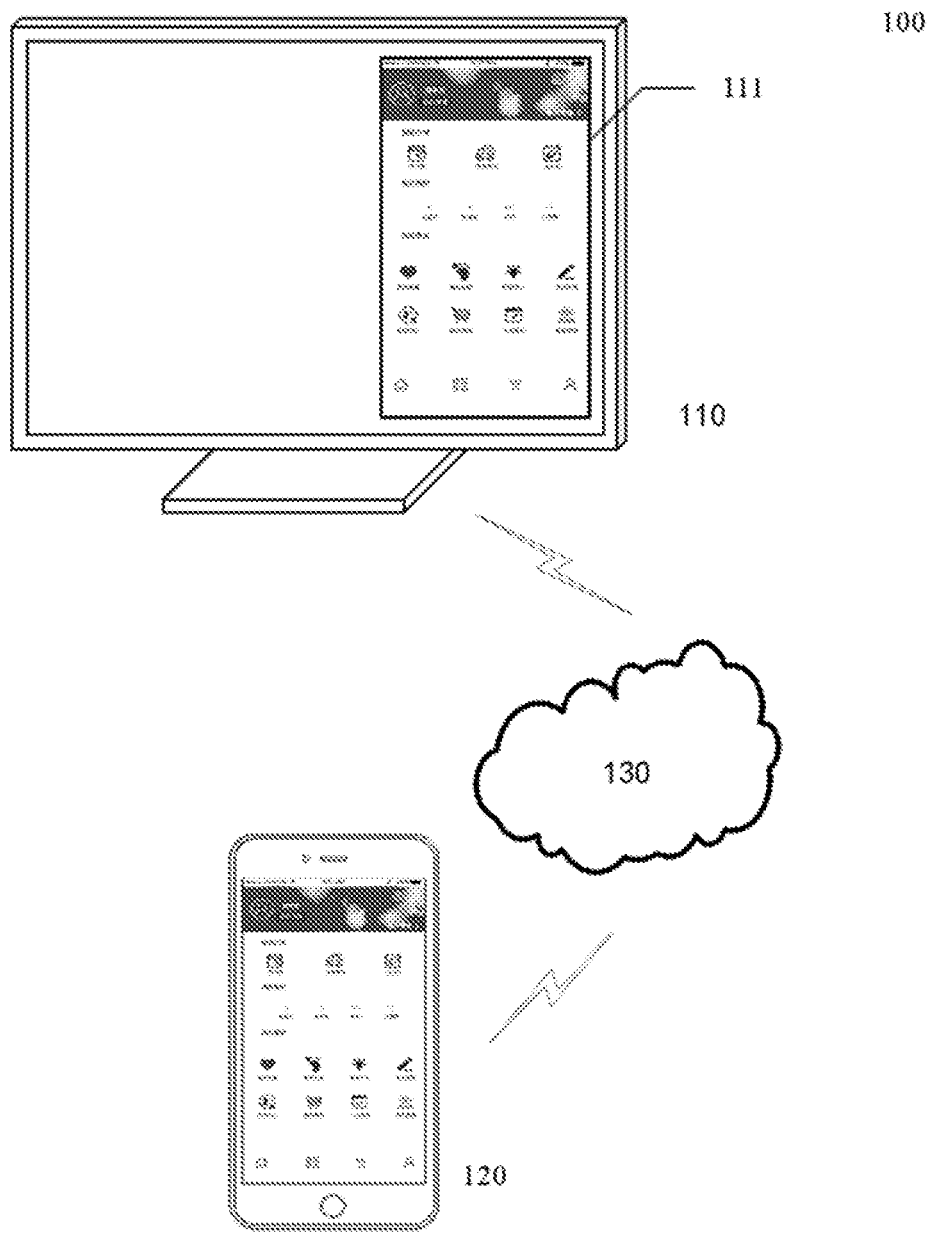
FIG. 1 illustrates an application scenario of an information processing method and an electronic device according to some embodiments of the present disclosure.

Embodiments of the present disclosure are described with reference to the drawings. However, these descriptions are only exemplary and are not intended to limit the scope of the present disclosure. In the following detailed description, to facilitate explanation, many specific details are set forth to provide a comprehensive understanding of embodiments of the present disclosure. However, one or more embodiments may also be implemented without these specific details. In addition, in the following description, descriptions of well-known structures and technologies are omitted to avoid unnecessarily obscuring the concept of the present disclosure.

The terms used in this disclosure are only for describing specific embodiments and are not intended to limit the present disclosure. The terms "including", "containing", etc., used herein indicate the existence of the features, steps, operations, and/or components, but do not exclude the presence or addition of one or more other features, steps, operations, or components.

All terms (including technical and scientific terms) used herein have the meanings commonly understood by those skilled in the art unless otherwise defined. The terms used here should be interpreted as having a meaning consistent with the context of the present specification, and should not be interpreted in an idealized or overly rigid manner.

The term "at least one of A, B, or C, etc.," should be interpreted according to the meaning of the expression commonly understood by those skilled in the art (e.g., "having at least one system of A, B, or C, etc.," should include but not limited to having A alone, B alone, C alone, A and B, A and C, B and C, and/or A, B, C, etc.).

A number of block diagrams and/or flowcharts are shown in the drawings. Some blocks in the block diagrams and/or flowcharts or a combination thereof may be implemented by computer program instructions. These computer program instructions can be provided to a processor of a general-purpose computer, a special-purpose computer, or other programmable data processing device, so that these instructions can create a device configured to implement the functions/operations described in these block diagrams and/or flowcharts when the processor executes these instructions. The technology of the present disclosure may be implemented in forms of hardware and/or software (including firmware, microcode, etc.). Also, the technology of the present disclosure may include a form of a computer program product of a computer-readable storage medium storing instructions. The computer program product may be provided to an instruction execution system for use or in connection with an instruction execution system for use.

In the context of the present disclosure, a computer-readable medium may be any medium that can contain, store, transmit, propagate, or transmit instructions. For example, a computer-readable medium may include but is not limited to, an electric, magnetic, optical, electromagnetic, infrared, or semiconductor system, device, device, or propagation medium. A specific example of the computer-readable medium includes a magnetic storage device, such as a magnetic tape or a hard disk (HDD), an optical storage device such as an optical disk (CD-ROM), a memory such as a random access memory (RAM) or flash memory, and/or wired/wireless communication link.

Embodiments of the present disclosure provide an information processing method. The method includes, after establishing a communication link/connection with a mobile terminal, receiving display data through a first transmission channel. The display data is data displayed on a screen of the mobile terminal. The method further includes displaying an image of the display data in a first display area, receiving first input information and second input information, converting the second input information into a control instruction, and determining a responding object of the control instruction based on the first input information. If the first input information is in the first display area, the first input information is converted to conversion information. The conversion information and the control instruction are transmitted through a second transmission channel, such that the mobile terminal may respond to the control instruction based on the conversion information. If the first input information is in the second display area other than the first display area, the mobile terminal may respond to the control instruction base on the first input information.

The information processing method of embodiments of the present disclosure may include determining a responding object by receiving the first input information. The responding object refers to the device or the application that may execute instructions according to the input information. When the responding object is the mobile terminal, the device may convert second input information matched with an input logic of the electronic device into the control instruction by converting the first input information into the conversion information matching with the mobile terminal. The device may further transmit the conversion information and the control instruction to the mobile terminal. As such, the mobile terminal may respond to the control instruction based on the conversion information to achieve an effect of using the interaction of the electronic device to operate the screen interface of the smartphone. Thereby, in embodiments of the present disclosure, the user operations at the electronic device terminal to operate the screen interface of the smartphone is simplified. Thus, the user experience is improved. The electronic device, such as a desktop computer or a laptop computer, may be a first electronic device, and the mobile terminal or a smartphone may be a second electronic device.

FIG. 1 illustrates an application scenario of an information processing method and an electronic device according to some embodiments of the present disclosure. FIG. 1 only shows an example of the application scenarios, in which embodiments of the present disclosure can be applied to help those skilled in the art to better understand technical content. Embodiments of the present disclosure are not limited and may be used for other devices, systems, environments, or scenarios.

As shown in FIG. 1, an application scenario 100 includes a first electronic device 110 and a second electronic device 120.

The first electronic device 110 may include a terminal device such as a desktop computer, a laptop computer, a smart tv, or a tablet, etc. Similarly, the second electronic device 120 may include a portable terminal such as a mobile phone, a tablet, etc. For example, the first electronic device 110 and the second electronic device 120 can communicate with each other through a connection channel. The connection channel may include a WIFI direct connection channel, a network connection channel, or a connection channel established by a network 130 shown in FIG. 1. The network 130 may include various connection types, such as wired and/or wireless communication links, etc.

In some embodiments, for example, the second electronic device 120 may send display data to the first electronic device 110 through the connection channel, such that the first electronic device 110 may display an image corresponding to the display data of the second electronic device 120. The display data may be obtained by compressing the image currently displayed on the screen of the second electronic device 120.

First, for example, the first electronic device 110 and the second electronic device 120 may establish a connection through a low-power consumption method, to know the existence of each other in a surrounding environment. For example, the low power consumption method may include a Bluetooth Low Energy (BLE) channel. Establishing of the low-power consumption connection may include, for example, that the first electronic device 110 and the second electronic device 120 each broadcast device information of their own. The device information may include, for example, a Bluetooth address, a WIFI address, and an device model name, etc. The first electronic device 110 and the second electronic device 120 may know the existence of each other according to the broadcasted device information.

After the first electronic device 110 establishes a low-power consumption connection with the second electronic device 120, the first electronic device 110 may create a connection channel. As such, the second electronic device 120 can send an image frame to the first electronic device 110 through the connection channel. The first electronic device 110 may establish the connection channel through the following processes. According to the service set identifier (SSID) and basic service set identifier (BSSID) sent by the second electronic device 120, the first electronic device 110 determines whether the second electronic device 120 is in a same local area network with the first electronic device 110. If the second electronic device 120 and the first electronic device 110 are in the same local area network, the first electronic device 110 creates a transmission control protocol (TCP) connection with the second electronic device 120. If the second electronic device 120 and the first electronic device 110 are in different local area networks, the first electronic device 110 creates a peer to peer (P2P) group to establish a connection with the second electronic device 120 in a networking method.

After establishing a connection channel with the second electronic device 120, the first electronic device 110 may perform transmission of the display data and the control instruction to screen project and display the image of the second electronic device 120 in a first display area 111 of the screen of the first electronic device 110. The first electronic device 110 may also control the second electronic device 120 to change the image according to the input information received by the first electronic device 110. The position of the first display area on the screen of the first electronic device 110 is merely used as an example to help understanding embodiments of the present disclosure and is not limited by the present disclosure.

In some embodiments, the display data and the control instruction may be transmitted through a data transmission sub-channel and an instruction transmission sub-channel, respectively, to distinguish transmission of different types of data. In other embodiments, the display data and the control instruction may also be transmitted through a same transmission sub-channel.

In some embodiments, the information processing method may be executed by the first electronic device 110. Correspondingly, the electronic device provided by embodiments of the present disclosure may include the first electronic device 110.

The types of the first electronic device 110, the second electronic device 120, and the network 130 described above are only examples. Any types of the first electronic device 110, the second electronic device 120, and the network 130 may be used according to specific requirements of the embodiments.

The information processing method of embodiments of the present disclosure is described below referring to FIGS. 2-5 in connection with the application scenario in FIG. 1.

Figure 2:
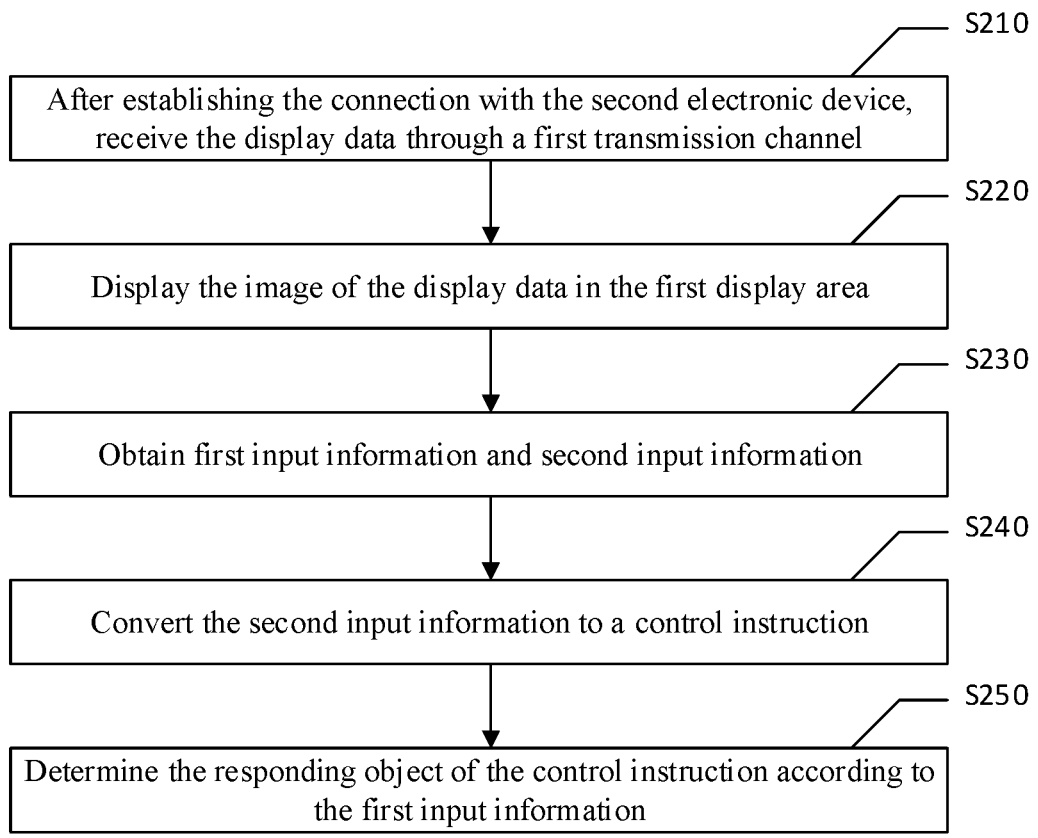
FIG. 2 illustrates a schematic flowchart of the information processing method according to some embodiments of the present disclosure.

FIG. 2 illustrates a schematic flowchart of the information processing method according to some embodiments of the present disclosure.

As shown in FIG. 2, the information processing method may include processes S210 to S250. For example, the information processing method may be executed by the first electronic device 110.

At S210, after establishing the connection with the second electronic device, the first electronic device 110 receives the display data through a first transmission channel.

In some embodiments, establishing the communication link/connection may include, for example, establishing the above-described connection channel. The display data may be the data to be displayed on the screen of the second electronic device 120. For example, the display data may include a display interface displayed on the screen of the second electronic device 120 in real-time. The display data includes an image frame of the display interface. The image frame may be dynamically updated. For example, when an operation of returning to an upper-level interface is performed for the second electronic device 120, the display data of the second electronic device 120 is changed from the current display interface to the upper-level interface to dynamically update the display data.

In some embodiments, the first transmission channel may include, for example, a transmission channel, which is established by the above-described TCP connection, or a dedicated data transmission channel. The second electronic device 120 may transmit the display data to the first electronic device 110 through the first transmission channel. In some embodiments, the transmission channel established by the TCP connection may include, for example, a plurality of sub-channels. The first transmission channel may be a data transmission sub-channel of the plurality of sub-channels.

At S220, the first electronic device 110 displays the image of the display data in the first display area.

The process S220 may include, after receiving the display data, decompressing the display data to form an image frame, and displaying the image frame. In some embodiments, the first electronic device 110 may be installed with, for example, a screen projection application. The first display area may be a display window of the screen projection application.

At S230, the first electronic device 110 receives first input information and second input information.

In some embodiments, the first input information may include, for example, coordinate information of a display object corresponding to an input device of the first electronic device on the screen of the first electronic device, or coordinate information of an area covered when the display object moves. The input device may include a mouse, a keyboard, a capacitive pen, or a user's hand, etc.

In some embodiments, the second input information may include input information generated by the user's hand or the capacitive pen touching the screen. In other embodiments, the second input information may include trigger information generated by triggering at least one key of the input device of the first electronic device. The trigger information may include trigger information generated by triggering a button of a mouse, trigger information generated by triggering a key of a keyboard, or trigger information generated by triggering a key of a keyboard and a key of the mouse simultaneously.

In some embodiments, the user's hand or capacitive pen touches the screen of the first electronic device 110 and/or the trigger button according to the input logic of the first electronic device 110. Therefore, the second input information received is the information that matches the input logic of the first electronic device. For example, if the user wants to select a portion of a display content of the image, the second input information may include information of the display area covered by the area that the display object moves through when the display object moves in the display area of the portion of the display content. The second input information may also include information selected by triggering a left button of a mouse a plurality of times to sequentially select a plurality of display contents in the first display area, when a "Ctrl" key of a keyboard is triggered. If the user wants to select all the contents displayed in the screen in the first display area, the second input information may include information by triggering the "Ctrl" key and an "A" key of a keyboard simultaneously. If the user wants to move the image up, the second input information may include information by triggering a mouse wheel to scroll down or up, or information by triggering a "move down key" of a keyboard. The above-described second input information is merely an example used to help to understand the present disclosure, and is not limited by the present disclosure.

In some embodiments, the second input information may include trigger information by simultaneously triggering some keys of the keyboard of the first electronic device 110. For example, in addition to the trigger information of simultaneously triggering the "Ctrl" key and the "A" key, the trigger information may also include at least one of the following trigger information, such as the trigger information when the "Ctrl" key and a "C" key are simultaneously triggered, the trigger information when the "Ctrl" key and a "V" key are simultaneously triggered, the trigger information when the "Ctrl" key and an "X" key are simultaneously triggered, or the trigger information when a plurality of keys of the keyboard are continuously triggered. The second input information may also include trigger information that keys of the keyboard and the mouse are simultaneously triggered, for example, besides the information that the "Ctrl" key is triggered and the left mouse button is triggered the plurality of times, information that a "Shift" key is continuously triggered, and the left button of the mouse is triggered at two different positions corresponding to display objects. Besides, the second input information may include trigger information by triggering the button of the mouse individually, for example, the trigger information by triggering the scroll button of the mouse to scroll down, the trigger information by continuously triggering the left button of the mouse, the trigger information by triggering the left button of the mouse two times in a row, the trigger information by triggering the mouse in two different methods (e.g., the trigger information by triggering the left button of the mouse first and then releasing the left button of the mouse, and then continuously triggering the left button of the mouse), etc.

At S240, the first electronic device converts the second input information to a control instruction.

In some embodiments, the process S240 may include, for example, determining an operation that needs to be performed by the second electronic device corresponding to the second input information according to the input logic of the first electronic device 110, and then determining the control instruction being sent to the second electronic device 120 according to the operation.

In some embodiments, if the second input information is the trigger information by simultaneously triggering the "Ctrl" key and the "A" key of the keyboard, the first electronic device 110 determines that the operation which needs to be executed by the second electronic device is a select all operation. Then, the first electronic device 110 determines that the control instruction is sent to the second electronic device 120 is an operation control instruction that controls the second electronic device 120 to select all the contents in the image. For example, if the second input information includes the trigger information by triggering the left mouse button, then releasing the left mouse button, and then continuously triggering the left mouse button, the first electronic device 110 determines the operation, which needs to be executed by the second electronic device, is an operation control instruction to move the content at the position represented by the position information when the left mouse button is first triggered. In other embodiments, the first electronic device 110 determines the operation, which needs to be executed by the second electronic device, may also include an operation control instruction of inputting a character string in an input box at the position represented by the position information according to the second input information.

In some embodiments, the second input information includes the trigger information of triggering the left mouse button first, releasing the left mouse button, and then continuously triggering the left mouse button. The position represented by the position information included in the first input information is moved from the first display area to other display areas. Further, when the display content at the initial position is a file, the electronic device 100 determines that the control instruction may further include an operation control instruction of transmitting the file at the initial position to the first electronic device 110.

In some embodiments, to facilitate the determination of the control instruction, the first electronic device 110, for example, may pre-store an instruction mapping table. A correspondence relationship between the second input information and the control instruction is established in the instruction mapping table. The process S240 may include, based on the instruction mapping table, determining the control instruction corresponding to the second input information received from the instruction mapping table and the process S230 to convert the second input information into the control instruction.

At S250, the first electronic device determines the responding object of the control instruction according to the first input information.

In some embodiments, the process S250 may include determining whether the position represented by the position information is in the first display area according to the position information included in the first input information. The process S250 may be obtained through the process S351 to S353 shown in FIG. 3, which are not repeated here.

Figure 3:
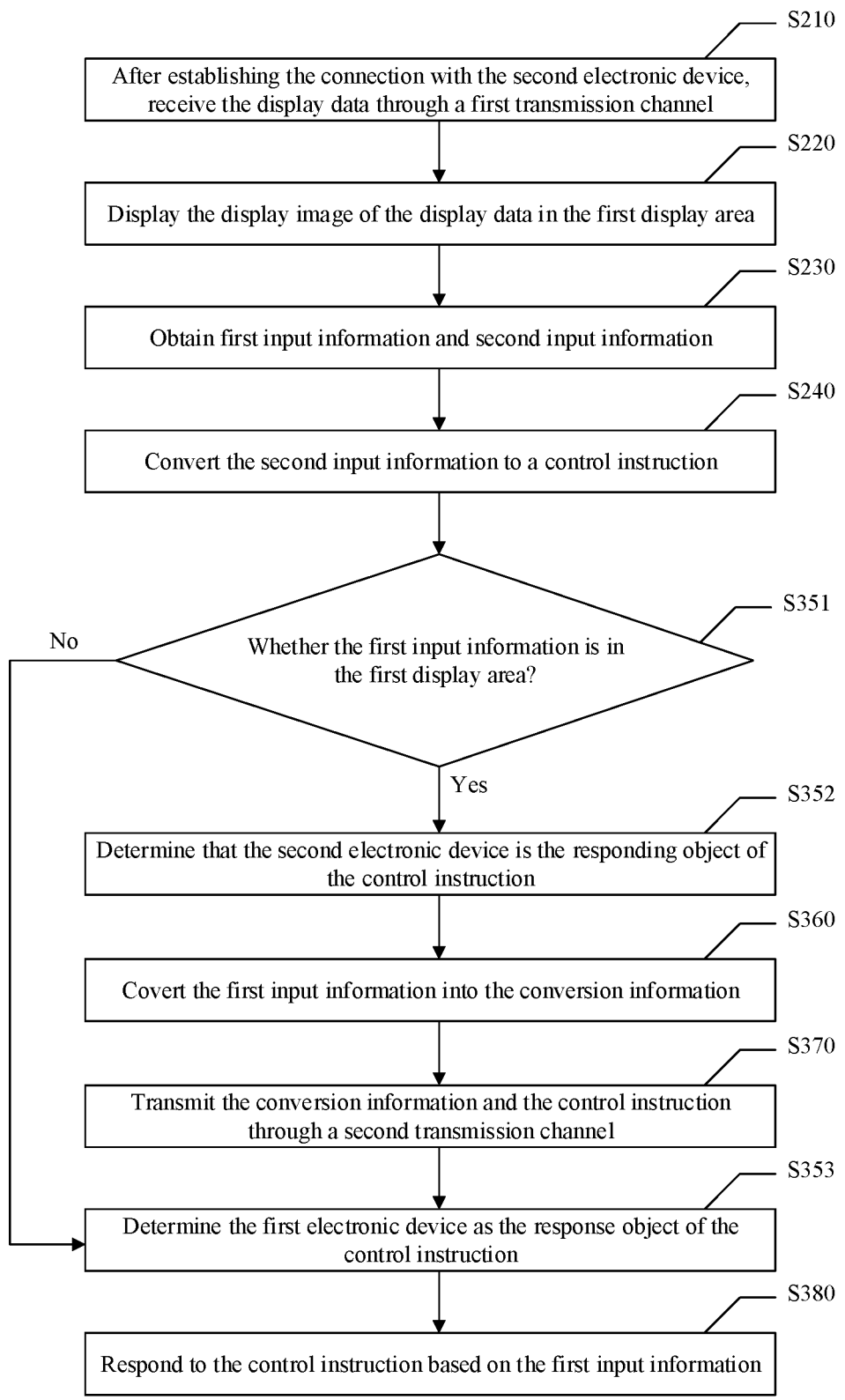
FIG. 3 illustrates another schematic flowchart of the information processing method according to some embodiments of the present disclosure.

FIG. 3 illustrates another schematic flowchart of the information processing method according to some embodiments of the present disclosure.

As shown in FIG. 3, the process S250 of determining the responding object of the control instruction includes processes S351 to S353.

At S351, the first electronic device 110 determines whether the first input information is in the first display area.

In some embodiments, since the first input information may include the coordinate information, the process S351 may include determining whether the coordinate position represented by the coordinate information is in the first display area. In some embodiments, the coordinate information may include the coordinate value representing the display object that establishes a first coordinate system based on the screen of the first electronic device 110. The process S351 may include determining a coordinate range of the first display area in the first coordinate system, and then determining whether the coordinate value represented by the coordinate information is within the coordinate range.

If the coordinate value represented by the coordinate information is within the coordinate range, the first electronic device 110 may determine that the received first input information is in the first display area. As such, the first electronic device 110 may determine that the display object of the input device is in the first display area. Therefore, the user may need to operate the image of the first display area. Considering that the first electronic device 110 may not be able to operate the projection interface, therefore, the first electronic device 110 may determine that the second electronic device 120 is the responding object of the control instruction, that is, the process S352 is executed.

In some embodiments, the responding object of the control instruction is determined to be the second electronic device. To make the second electronic device to change the image, as shown in FIG. 3, the information processing method of embodiments of the present disclosure further includes processes S360 to S370. The processes S360 to S370 are executed after the process S352.

At S360, the first electronic device coverts the first input information into the conversion information.

In some embodiments, considering that the first input information may be the coordinate information, the coordinate information may be the coordinate value representing the display object in the first coordinate system established based on the screen of the first electronic device 110. To facilitate the second electronic device 120 to determine the operation object of the image for the first input information, the first electronic device 110 converts the first input information through the process S360.

Therefore, the process S360 may include converting the coordinate value represented by the coordinate information of the first input information into a coordinate value of a second coordinate system established based on the first display area 111. The obtained conversion information may include, for example, the coordinate value obtained converted based on the second coordinate system. The size of the first display area 111 may be, for example, the same as the size of the screen of the second electronic device 120.

At S370, the first electronic device transmits the conversion information and the control instruction through a second transmission channel.

In some embodiments, the second transmission channel may include, for example, the transmission channel established by the above-described TCP connection, or a dedicated control instruction transmission channel. In some embodiments, the transmission channel established by the TCP connection may include, for example, a plurality of sub-channels. The second transmission channels may be, for example, a control instruction transmission sub-channel of the plurality of sub-channels. In some embodiments, the second transmission channel and the first transmission channel may be, for example, the same transmission channel.

After the first electronic device 110 transmits the conversion information and the control instruction through the second transmission channel, the second electronic device 120 may receive the conversion information and the control instruction through the second transmission channel. According to the conversion information, the second electronic device 120 may locate the content that needs to be operated by the user in the image, and then operates the content that needs to be operated by responding to the control instruction. Thereby, the image is changed. When the control instruction is the operation control instruction to transmit the file to the first electronic device 110, the second electronic device 120 may transmit the file to the first electronic device 110 through the first transmission channel or any one of the sub-channels of the connection channel.

If the coordinate value represented by the coordinate information is not in the coordinate range, the first electronic device 110 determines that the first input information is not in the first display area but the second display area other than the first display area. Under this situation, the first electronic device 110 may determine that the display object of the input device is not in the first display area, such that the user needs to operate other images except the projection image in the first electronic device 110. Therefore, the first electronic device 110 may be determined as the responding object of the control instruction, that is, the process S353 is executed. The second display area may include any area other than the first display area in the screen of the first electronic device 110.

In some embodiments, to facilitate the first electronic device 110 to respond to the control instruction, as shown in FIG. 3, the information processing method of embodiments of the present disclosure further includes the process S380. The first electronic device 110 responds to the control instruction based on the first input information. The process S380 may include, for example, determining the content that the user needs to operate according to the first input information, and then operating the content that the user needs to operate according to the control instruction.

In some embodiments, after the image is changed, to ensure the first electronic device 110 to change the image of the projection screen synchronously, the second electronic device 120 may further compress the image frame of the image updated in real-time to obtain the updated display data. Then, the second electronic device 120 transmits the updated display data to the first electronic device 110, such that the first electronic device 110 may update the image in the first display area. The second electronic device 120, for example, may transmit the updated display data through the above-described first transmission channel.

Figure 4:
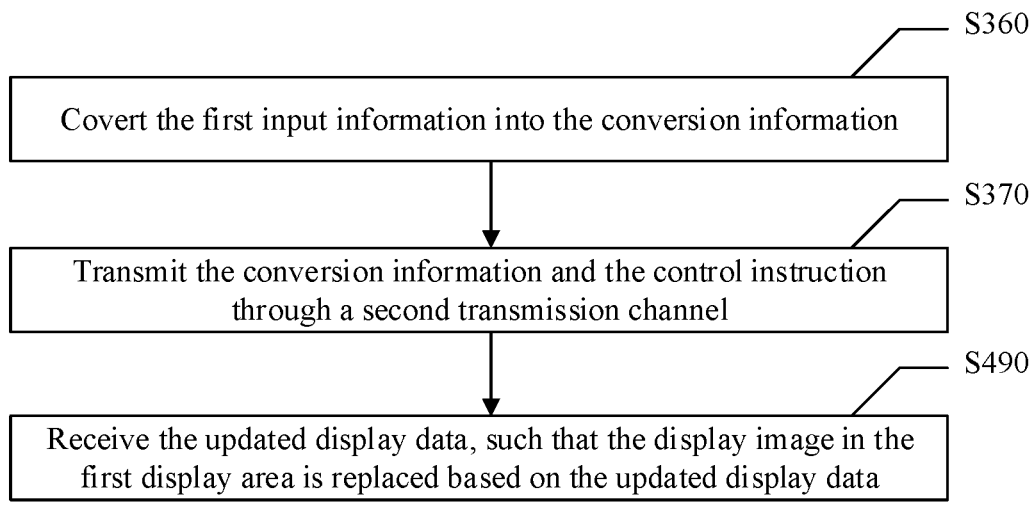
FIG. 4 illustrates another schematic flowchart of the information processing method according to some embodiments of the present disclosure.
Figure 5:
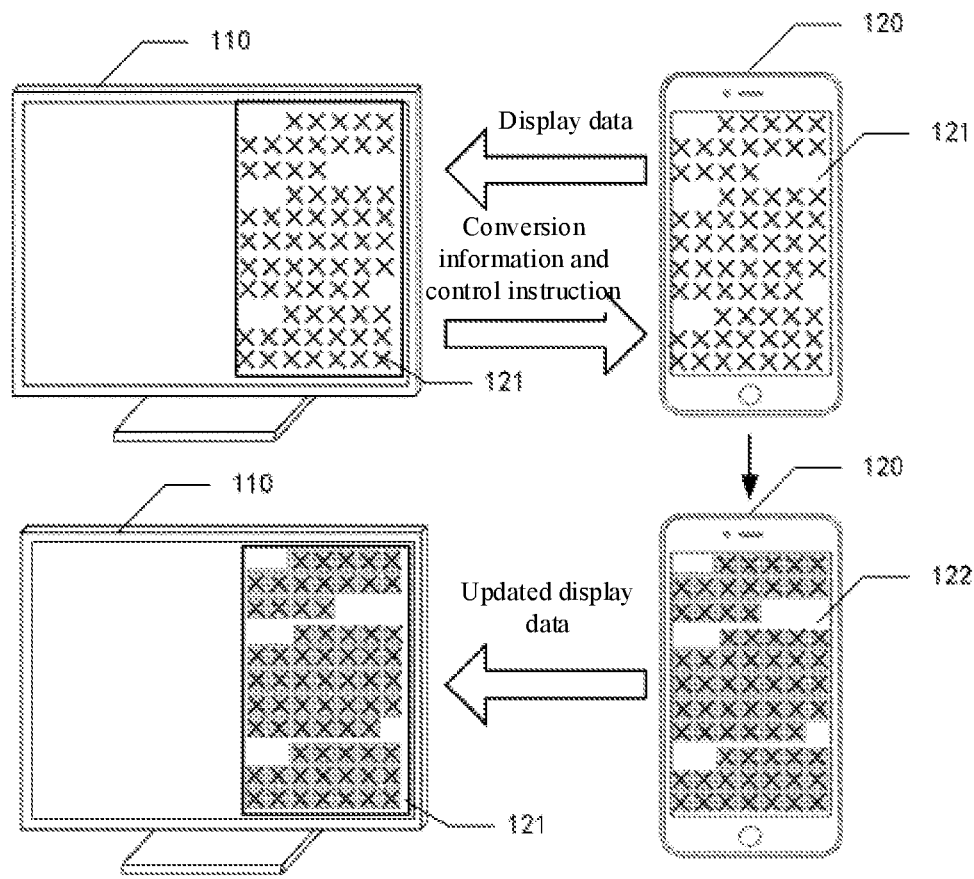
FIG. 5 illustrates a schematic diagram of refreshing an image in a display area through the information processing method shown in FIG. 4.

FIG. 4 illustrates another schematic flowchart of the information processing method according to some embodiments of the present disclosure. FIG. 5 illustrates a schematic diagram of refreshing an image in a first display area through the information processing method shown in FIG. 4.

As shown in FIG. 4, after determining that the responding object is the second electronic device 120, the information processing method of embodiments of the present disclosure further includes performing the process S490 besides the processes S360 to S370.

At S490, the first electronic device receives the updated display data, such that the image in the first display area is replaced based on the updated display data.

The updated display data is the updated display data transmitted by the above-described second electronic device 120 through the first transmission channel. Replacing the image in the first display area based on the updated data may include obtaining an updated image through the process similar to S220 according to the updated display data, and then displaying the updated image in the first display area to cover the previous image.

In some embodiments, as shown in FIG. 5, in the initial state, the second electronic device 120 displays an user interface image 121. Through the first transmission channel established between the second electronic device 120 and the first electronic device 110, the second electronic device 120 may transmit the display data obtained according to the user interface image 121 to the first electronic device 110. As such, the first electronic device 110 may display the user interface image 121 in the first display area. At this point, when the cursor of the first electronic device 110 is in the first display area, by triggering the keys "Ctrl" and "A" of the keyboard simultaneously, the first input information and the second input information may be received. The first input information is the coordinate information of the cursor, and the second input information is that the keys "Ctrl" and "A" are triggered simultaneously. The first electronic device 110 may obtain the control instruction through the processes S240 to S250 and determine that the responding object of the control instruction may be the second electronic device 120. The control instruction may include, for example, the operation control instruction of select all. Then, the first electronic device 110 may perform the processes S360 to S370 to transmit the conversion information and the control instruction to the second electronic device through the second transmission channel. After receiving the conversion information and the control instruction, the second electronic device 120 may respond to the control instruction to select all the contents of the user interface image 121 to obtain the user interface image 122, that is, the image of the content of the user interface image 121 having a shadow. At this point, the second electronic device 120 may obtain the updated display data according to the user interface image 122 and transmits the updated display data to the first electronic device 110 through the first transmission channel. The first electronic device 110 updates the image of the first display area according to the updated display data. That is, the first electronic device 110 uses the user interface image 122 to replace the user interface image 121 to synchronically update the projection image.

In summary, the information processing method of embodiments of the present disclosure may include interacting with the second electronic device 120 through the first electronic device 110, changing the image of the second electronic device 120 based on the input logic of the first electronic device 110, and changing the projection interface of the first electronic device 110 in time. Therefore, in the information processing method, the deficiency that the simulated operation is complex and difficult to execute when the first electronic device 110 performs input based on the input logic of the second electronic device 120 in the existing technology may be effectively avoided. Therefore, the user experience may be improved.

Figure 6A:
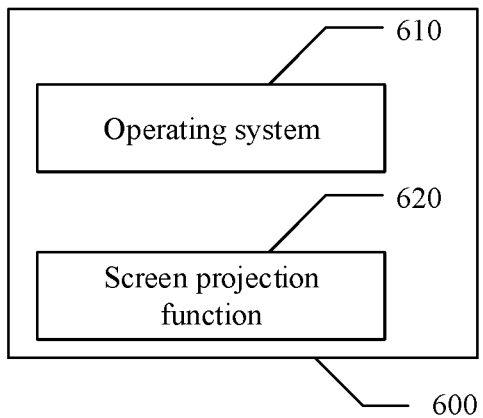
FIG. 6A illustrates a schematic structural block diagram of the first electronic device according to some embodiments of the present disclosure.
Figure 6B:
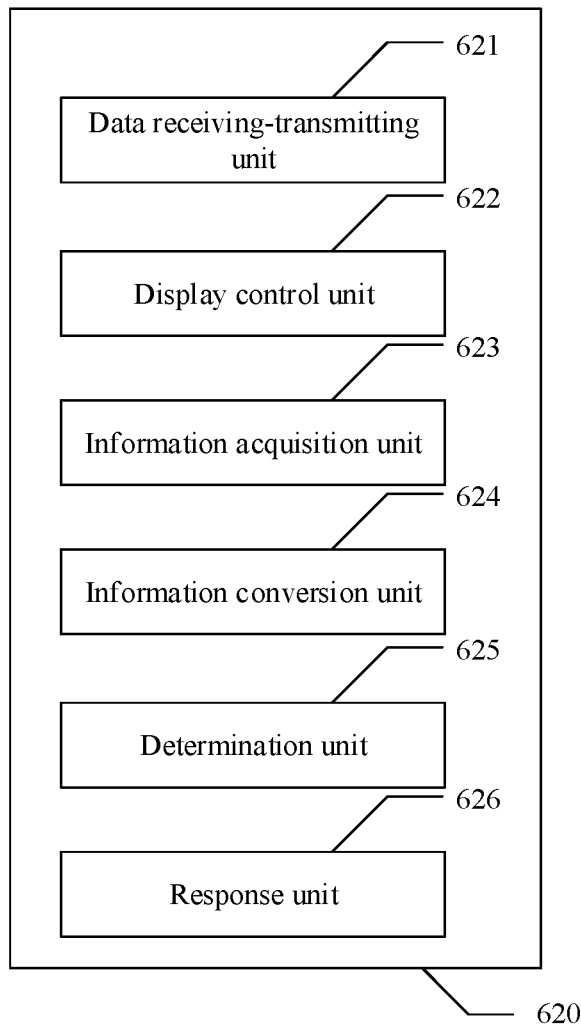
FIG. 6B illustrates a schematic structural block diagram of a screen projection function according to some embodiments of the present disclosure.

FIG. 6A illustrates a schematic structural block diagram of the first electronic device according to some embodiments of the present disclosure. FIG. 6B illustrates a schematic structural block diagram of a screen projection function according to some embodiments of the present disclosure.

As shown in FIG. 6A, a first electronic device 600 of embodiments of the present disclosure may include an operating system 610 and a screen projection function 620.

The screen projection function 620, for example, may include a functional module of the operating system 610, or an application having a screen projection function installed based on the operating system 610.

In some embodiments, as shown in FIG. 6A, the screen projection function 620, for example, may include a data receiving-transmitting unit 621, a display control unit 622, an information acquisition unit 623, an information conversion unit 624, and a determination unit 625.

The data receiving-transmitting unit 621 may be configured to receive display data through the first transmission channel (process S210) after the first electronic device and the second electronic device establish a communication link/connection. The display data may be the data to be displayed on the screen of the second electronic device.

The display control unit 622 may be configured to display a image of the display data in a first display area (process S220).

The information acquisition unit 623 may be configured to receive first input information and second input information (process S230).

The information conversion unit 624 may be configured to convert the second input information into a control instruction (process S240).

The determination unit 625 may be configured to determine a responding object of the control instruction based on the first input information (process S250).

In some embodiments, if the determination unit 625 determines that the first input information is in the first display area, the first electronic device 600 may be the responding object. Under this situation, the information conversion unit 624 may be further configured to convert the first input information into the conversion information (process S360). The data receiving-transmitting unit 621 may be further configured to transmit the conversion information and the control instruction through a second transmission channel (process S370), such that the second electronic device responds to the control instruction based on the conversion information.

In some embodiments, as shown in FIG. 6B, the screen projection function 620 may further include a response unit 626. The response unit 626 may be configured to respond to the control instruction based on the first input information (process S380), when the determination unit 625 determines that the first input information is in the second display area other than the first display area.

In some embodiments, the above-described data receiving-transmitting unit 621 may be further configured to receive updated display data to replace the image in the first display area based on the updated display data (process S490). The updated display data may correspond to updated display image of the second electronic device when the second electronic device responds to the control instruction based on the first conversion information.

In some embodiments, the above-described first input information may be coordinate information. The above-described second input information may be the trigger information generated by triggering at least one key.

In some embodiments, the above-described trigger information may be the trigger information generated by triggering a button of a mouse, and/or the above-described trigger information is trigger information generated by triggering a key of a keyboard.

In some embodiments, the above-described information conversion unit 624, for example, may be configured to determine a control instruction corresponding to the second input information based on an instruction mapping table.

In some embodiments, any plurality of modules, sub-modules, units, and sub-units or at least partial functions of any plurality thereof may be implemented in one module. In some embodiments, any one or plurality of modules, sub-modules, units, and sub-units may be implemented by being divided into a plurality of modules. In some embodiments, any one or plurality of modules, sub-modules, units, and sub-units may be at least partially implemented by a hardware circuit, for example, a field-programmable gate array (FPGA), a programmable logic array (PLA), a system on a chip, a system on a substrate, a system on a package, an application-specific integrated circuit (ASIC), or any other appropriate hardware or firmware by integrating or packaging the circuit, or anyone or any combination of software, hardware, and firmware. In other embodiments, any one or plurality of the modules, sub-modules, units, and sub-units may be at least partially implemented as a computer program module. When the computer program module is running, a corresponding function is executed.

For example, any number of the operating system 610, screen projection function 620, data receiving-transmitting unit 621, display control unit 622, information acquisition unit 623, information conversion unit 624, determination unit 625, and response unit 626 may be combined and implemented in one module, or anyone of the module may be divided into a plurality of modules. In other embodiments, at least partial functions of one or a plurality of modules may be combined with at least partial functions of other modules and are implemented in one module. In some embodiments, at least one of the operating system 610, screen projection function 620, data receiving-transmitting unit 621, display control unit 622, information acquisition unit 623, information conversion unit 624, determination unit 625, or response unit 626 may be at least realized by a hardware circuit, for example, a field-programmable gate array (FPGA), a programmable logic array (PLA), a system on a chip, a system on a substrate, a system on a package, an application-specific integrated circuit (ASIC), or any other appropriate hardware or firmware by integrating or packaging the circuit, or anyone or any combination of software, hardware, and firmware. In other embodiments, at least one of the operating system 610, screen projection function 620, data receiving-transmitting unit 621, display control unit 622, information acquisition unit 623, information conversion unit 624, determination unit 625, or response unit 626 may be at least realized by a computer program module. When the computer program module is running, a corresponding function is executed.

Figure 7:
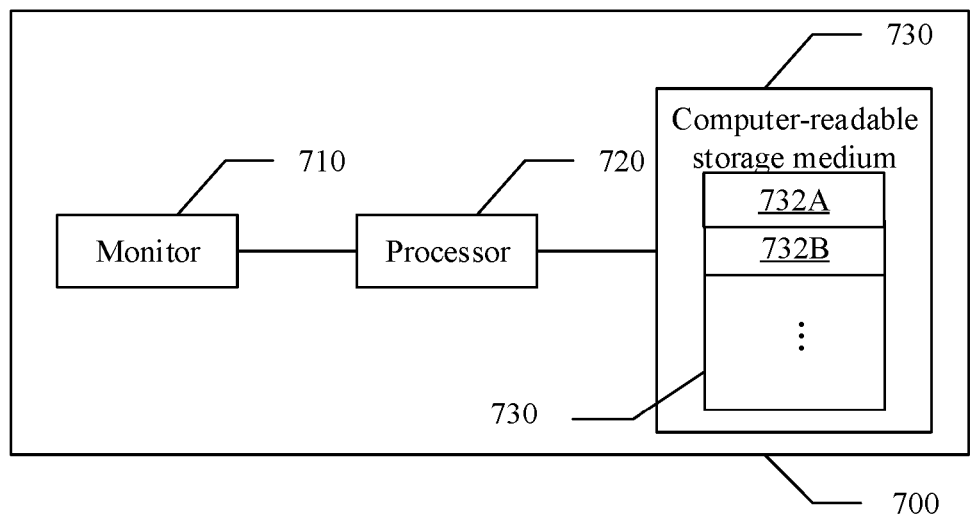
FIG. 7 illustrates a schematic structural block diagram of the electronic device suitable for executing the information processing method according to some embodiments of the present disclosure.

FIG. 7 illustrates a schematic structural block diagram of the first electronic device suitable for executing the information processing method according to some embodiments of the present disclosure. FIG. 7 only illustrates an example of the first electronic device and should not limit the function and application scope of embodiments of the present disclosure.

As shown in FIG. 7, a first electronic device 700 includes a monitor 710, a processor 720, and a computer-readable storage medium 730. The first electronic device 700 may execute the method according to embodiments of the present disclosure.

In some embodiments, the processor 720 may include, for example, a microprocessor, an instruction set processor, a related chipset, a special purpose microprocessor (for example, an application-specific integrated circuit (ASIC)), etc. The processor 720 may further include an onboard memory for caching purposes. The processor 720 may include a single processing unit or a plurality of processing units configured to execute different actions of the method flow of embodiments of the present disclosure.

The computer-readable storage medium 730 may include, for example, a non-volatile computer-readable storage medium, including but not limited to a magnetic storage device such as a magnetic tape or a hard disk (HDD), an optical storage device such as an optical disk (CD-ROM), a memory such as random access memory (RAM) or flash memory, etc.

The computer-readable storage medium 730 may include a computer program 731. The computer program 731 may include code/computer-executable instruction that, when executed by the processor 720, cause the processor 720 to execute the method or any variation of embodiments of the present disclosure.

The computer program 731 may be configured to have, for example, computer program code including a computer program module. For example, in an exemplary embodiment, the code in the computer program 731 may include one or more program modules, for example, including 731A, 731B, . . . . The division method and the number of modules are not fixed. Those skilled in the art may use an appropriate program module or a program module combination according to specific requirements. When the program module combination is executed by the processor 720, the processor 720 may perform the method according to embodiments of the present disclosure or any variations thereof.

The present disclosure also provides a computer-readable storage medium. The computer-readable storage medium may be included in the device/device/system described in the above embodiments or may exist alone without being assembled into the device/device/system. The above-described computer-readable storage medium stores one or more programs. When the above-described one or more programs are executed, the method of embodiments of the present disclosure is implemented.

In embodiments of the present disclosure, the computer-readable storage medium may be a non-volatile computer-readable storage medium, for example, may include but not limited to a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combination thereof. In the present disclosure, the computer-readable storage medium may be any tangible medium that contains or stores a program, and the program may be used by or in combination with an instruction execution system, device, or device.

The flowcharts and block diagrams in the accompanying drawings illustrate the possible implementation architecture, functions, and operations of the system, method, and computer program product according to various embodiments of the present disclosure. In this regard, each block in the flowchart or block diagram may represent a module, program segment, or a part of code, and the above-described module, program segment, or part of code include one or more executable instructions for realizing a specified logic function. In some alternative implementations, the functions marked in the block may also occur in a different order from the order marked in the drawings. For example, two blocks shown in succession can be executed substantially in parallel, or they can sometimes be executed in the reverse order, depending on the functions involved. Each block in the block diagram or flowchart, and the combination of blocks in the block diagram or flowchart, can be implemented by a dedicated hardware-based system that performs the specified function or operation, or can be realized by a combination of dedicated hardware and computer instructions.

Embodiments of the present disclosure provide an information processing method. The method includes receiving display data. The display data corresponds to an image frame and is dynamically updated. The method further includes determining a output method, and displaying/outputting the image frame based on the output method and the display data. If the determined output method is a first output method, an electronic device may display at least a first control component and displays and outputs a first image frame based on first display data. If the determined output method is a second output method, the electronic device displays and outputs a second image frame based on a second display data. The second frame image includes at least a second control component. The result of triggering the first control component and the result of triggering the second control component are the same.

Figure 8:
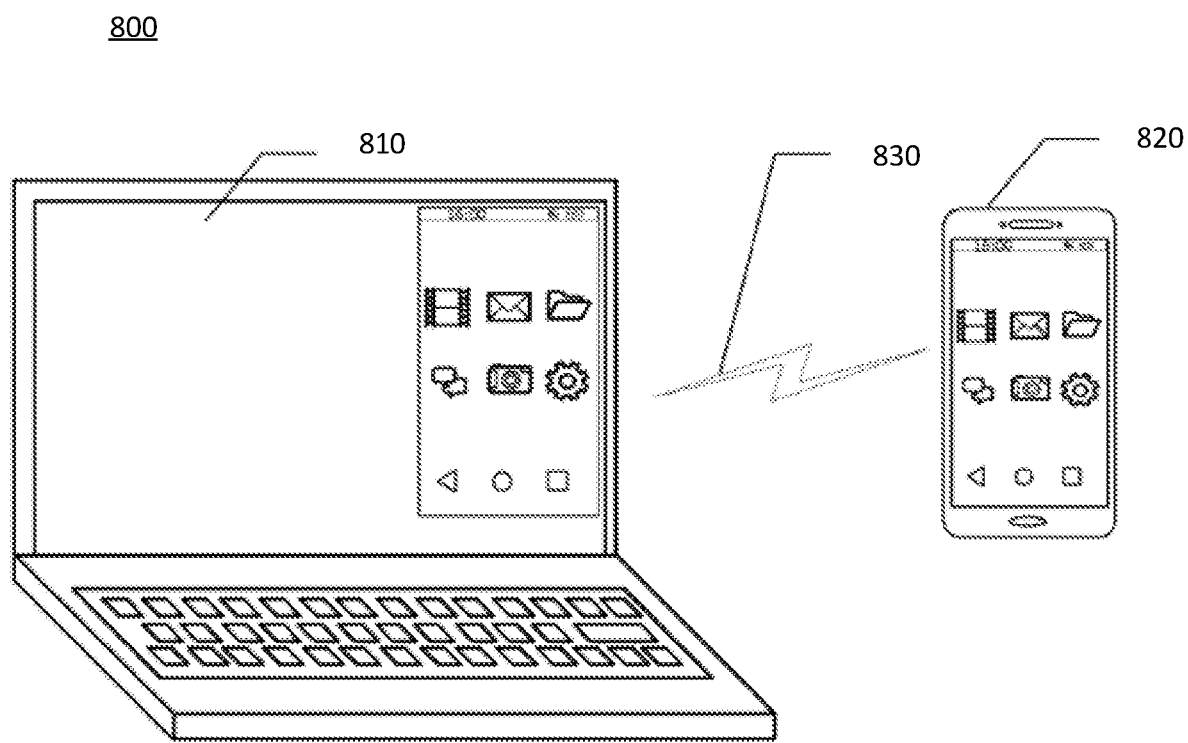
FIG. 8 illustrates an application scenario of an information processing method and an electronic device according to some embodiments of the present disclosure.

FIG. 8 illustrates an application scenario of an information processing method and an electronic device according to some embodiments of the present disclosure. FIG. 8 only shows an example of the application scenario of embodiments of the present disclosure to help those skilled in the art to understand the technical content. Embodiments of the present disclosure may be applied to other devices, systems, environments, or scenarios.

As shown in FIG. 8, the application scenario 800 includes, for example, a first electronic device 810, a second electronic device 820, and a connection channel 830.

The first electronic device 810 may include, for example, a computer, a tablet, etc. The second electronic device 820 may include, for example, a smartphone, etc.

In some embodiments, the second electronic device 820, for example, may transmit the image frame to the first electronic device 810 through the connection channel 830, such that the first electronic device 810 displays the image frame of the second electronic device 820. The image frame, for example, may include a current display interface of the second electronic device 810.

At an initial stage, for example, the first electronic device 810 and the second electronic device 820 may establish a connection through a low-power consumption method, which may include a Bluetooth broadcast method. After the first electronic device 810 and the second electronic device 820 establish the connection, the first electronic device 810 may create the connection channel 830. The connection channel 830 may include, for example, a WIFI direct connection channel. As such, the second electronic device 820 may transmit the image frame to the first electronic device 810 through the connection channel 830.

The information processing method of embodiments of the present disclosure is described with reference to FIGS. 9-11 and in connection with the application scenario in FIG. 8. The above-described application scenario is an example to help to understand the spirit and principle of the present disclosure. Embodiments of the present disclosure are not limited to the application scenario, in the contrary, may be applied to any other appropriate scenarios.

Figure 9:
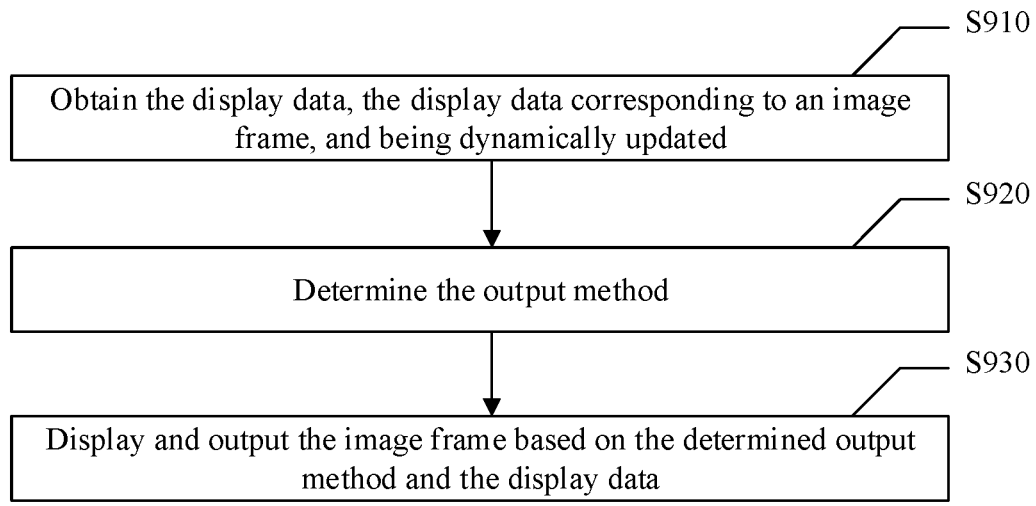
FIG. 9 illustrates a schematic flowchart of an information processing method according to some embodiments of the present disclosure.

FIG. 9 illustrates a schematic flowchart of an information processing method according to some embodiments of the present disclosure.

Figure 10A:
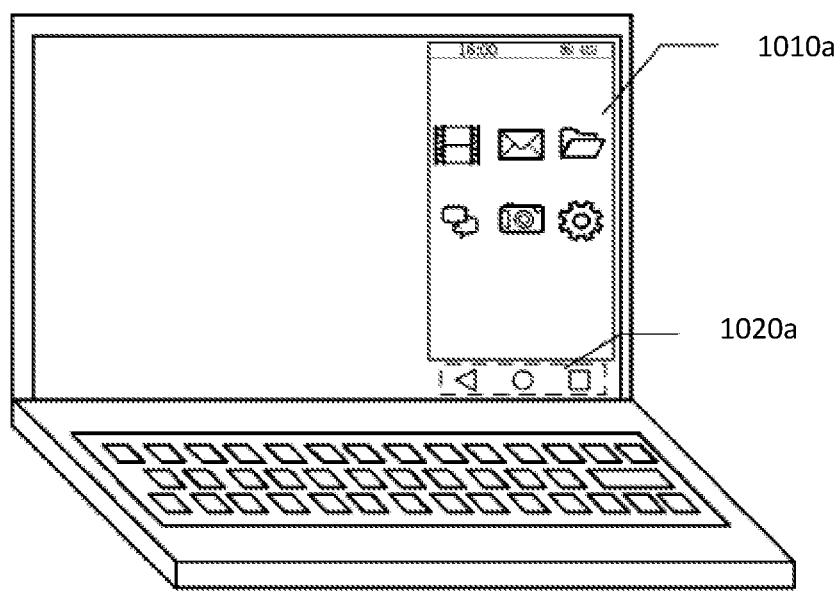
FIGS. 10A-10B illustrate a schematic diagram showing a display output according to some embodiments of the present disclosure.
Figure 10B:
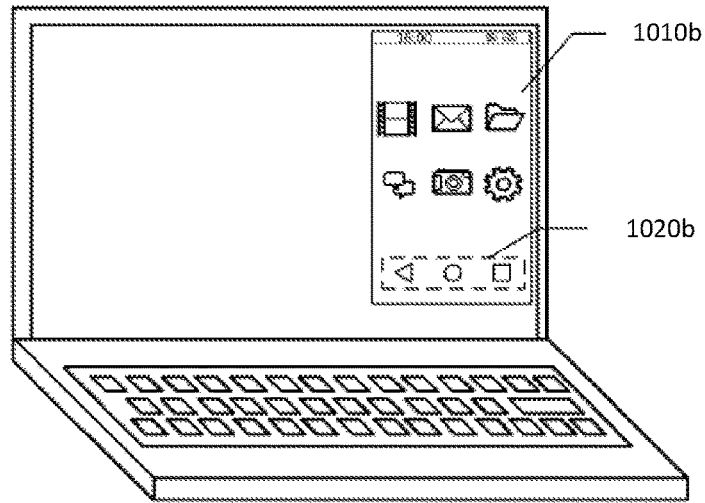

FIGS. 10A-10B illustrate a schematic diagram showing a display output according to some embodiments of the present disclosure. The method of embodiments of the present disclosure is described in connection with FIG. 9 and FIGS. 10A-10B.

As shown in FIG. 9, the method includes processes S910 to S930. The method may be applied to the first electronic device 810, which may be, for example, a computer.

At S910, the method includes receiving the display data, the display data corresponding to an image frame, and being dynamically updated.

In some embodiments, the display data may include, for example, display data of the first electronic device, or display data of the second electronic device. For example, the first electronic device may be a computer, and the second electronic device may be a smartphone.

The display data may be the data displayed on the first electronic device. For example, when an application of the first electronic device is running, if the application is a video player application, an image frame corresponding to a played video may be used as the display data. The image frame corresponding to the played video may be dynamically updated.

The display data may also be the display data of the second electronic device. The display data, for example, may be a current interface of the screen of the second electronic device. The display data may include an image frame of the screen of the second electronic device. The image frame may be dynamically updated. For example, when an operation of returning to an upper-level interface is performed on the second electronic device, the display data of the second electronic device is changed from the current interface to the upper-level interface. As such, the display data is dynamically updated.

In some embodiments, if the display data is the display data of the second electronic device, the first electronic device may receive the display data of the screen of the second electronic device through the connection channel with the second electronic device in real-time.

The connection channel, for example, may be established by the first electronic device. The connection channel may be, for example, a WIFI direct connection channel. The second electronic device may transmit the display data to the first electronic device through the connection channel. In other embodiments, the connection channel may include a plurality of sub-channels. The second electronic device may transmit the display data to the first electronic device through a first sub-channel of the plurality of sub-channels. The first sub-channel may transmit, for example, a large amount of data.

At S920, the method includes determining the output method.

At S930, the method includes displaying/outputting the image frame based on the determined output method and the display data.

As shown in FIG. 10A, if the output method determined by the first electronic device is the first output method, the first electronic device displays at least a first control component 1020*a* and displays and outputs a first image frame 1010*a* based on the display data.

For example, a display area of displaying the at least one first control component 1020*a* does not overlap with a display area of displaying/outputting the first image frame 1010*a* based on the first display data. That is, the first control component 1020*a* and the first image frame 1010*a* are separated. For example, the first control component 1020*a*, and the first image frame 1010*a* are next to each other. For example, the first control component 1020*a* may be displayed below and next to the first image frame 1010*a*.

As shown in FIG. 10B, if the output method determined by the first electronic device is the second output method, the first electronic device displays and outputs a second image frame 1010*b* based on the second display data. The second image frame 1010*b* includes at least a second control component 1020*b*. That is, the second image frame 1010*b* includes the second control component 1020*b* on its own.

In some embodiments, the result of triggering the first control component 1020*a* and the result of triggering the second control component 1020*b* are the same. For example, when the first control component 1020*a* and the second control component 1020*b* each include a return navigation button, whether the return navigation button of the first control component 1020*a* or the return navigation button of the second control component 1020*b* is triggered, the result is to return to an upper-level interface.

Embodiments of the present disclosure display/output the display data through different output methods. For example, when the image frame of the smartphone is projected on the computer, if the image frame of the smartphone includes a control component, the image frame projected on the computer also includes a control component. Thus, the user may perform the related operations through the control component on the computer. On the other hand, if the smartphone is operated in a full-screen mode, the image frame of the smartphone does not include the control component. As such, the image frame projected on the computer does not include the control component. Thus, a process for a user to operate the image frame displayed on the computer through a mouse or a keyboard is complex and difficult to operate. Therefore, in some embodiments, an external control component may be added in the display area of the computer to facilitate performing a related operation through the control component. As such, the interaction between the computer and the smartphone is more intelligent, which satisfies the use needs of the user and improves the user experience.

In some embodiments, if the display data is the display data of the second electronic device, the process S920 includes, for example, obtaining configuration information of the second electronic device based on the connection channel with the second electronic device. The configuration information may include, for example, system configuration information of the second electronic device. The connection channel may include a plurality of sub-channels. The second electronic device may transmit the configuration information to the first electronic device through a second sub-channel of the plurality of sub-channels. The second sub-channel may transmit a small amount of data. In other embodiments, the configuration information may also be transmitted through the first sub-channel.

If the configuration information indicates that the second electronic device determines a system instruction based on an input gesture, the output method may be determined as the first output method. That is, if the second electronic device is operated and controlled based on the input gesture, the screen of the second electronic device may not display the control component that may trigger the system instruction. The control component may be, for example, a navigation button of the second electronic device. Thus, the first electronic device may display the at least one first control component and the first image frame to facilitate the user to perform the related operation on the first electronic device through the first control component. As such, the problem of inconvenient operation by the input gesture when the screen content of the second electronic device (smartphone) is projected onto the computer is avoided for the first electronic device being a computer. As such, a related input may be performed through the first control component, which is convenient for the user to use.

For example, the second electronic device may determine the system instruction based on the input gesture through the following processes. When the user swipes from the bottom to the top on the screen of the second electronic device, the display interface of the second electronic device may return to the desktop, or when the user swipes from the side to the middle on the screen of the second electronic device, the second electronic device may return to the upper-level interface.

If the configuration information indicates that the second electronic device determines the system instruction based on the control component, the output method may be determined as the second output method. That is, if the second electronic device is operated based on the control component, the second electronic device may display the control component that may trigger the system instruction on the screen. The control component may include, for example, the navigation button of the second electronic device. The user may realize the operation of, for example, returning to the desktop or the upper-level interface through the navigation button. Therefore, the first electronic device may display the second image frame. The image frame may include the second control component.

Embodiments of the present disclosure may include determining the output method through whether the second electronic device determines the system instruction based on the input gesture or the control component. Thereby, the display data may be displayed and outputted through the different output methods in real-time. As such, the interaction between the first electronic device and the second electronic device may be more intelligent, which may satisfy the user's needs and improve the user experience.

In some embodiments, if the first display data and the second display data are the same, displaying/outputting the first image frame based on the first display data further includes separating the control component and image of the image frame corresponding to the display data, and displaying/outputting the image. For example, when both of the first display data and the second display data may include the control component, the first electronic device may separate the image and the control component of the first image frame corresponding to the first display data and hide the control component.

For example, when the image frame corresponding to the display data is an image frame of a recording scenario, the image frame may include an image (e.g., a preview image) and a recording control component. Recording may start by clicking the recording control component. The recording control component of the display data may overlap with the image to block the image. Therefore, embodiments of the present disclosure may hide the control component and display the image in a display area corresponding to the first electronic device by separating the control component and the image. Embodiments of the present disclosure may further add and display the first control component in an area (e.g., a neighboring area) that does not overlap with the display area of the image in the first electronic device. The recording may start by clicking the first control component. This method may use the advantage of the large screen of the first electronic device, such that the control component may not block the image displayed in the first electronic device.

In other embodiments, when the image frame corresponding to the display data is an image frame of a gaming application, the image frame may include an image (e.g., gaming image) and a gaming control component. The user may perform a gaming operation through the gaming control component. The gaming control component of the display data may overlap with the gaming image to block the gaming image. Therefore, embodiments of the present disclosure may hide the gaming control component and display the gaming image in an area corresponding to the first electronic device. Embodiments of the present disclosure may further add and display the first control component to an area that may not overlap with the display area of the image in the first electronic device. The user may perform the gaming operation by clicking the first control component.

In other embodiments, the display data of the recording scenario or the display data of the gaming application may be the display data of the second electronic device (e.g., a smartphone) or the display data of the first electronic device (e.g., a computer). On the one hand, when the display data may be the data to be displayed on the second electronic device (e.g., a smartphone), the second electronic device may transmit the display data to the first electronic device. Then, the first electronic device may separate the control component and image of the image frame corresponding to the display data, display the image, and hide the control component. On the other hand, if the display data is the display data of the first electronic device, for example, the first electronic device (e.g., a computer) may download and run an application that may meet the operating habits of the second electronic device (e.g., smartphone). The first electronic device may separate the control component and the image of the image frame corresponding to the display data, and then, output the image, and hide the control component.

Figure 11:
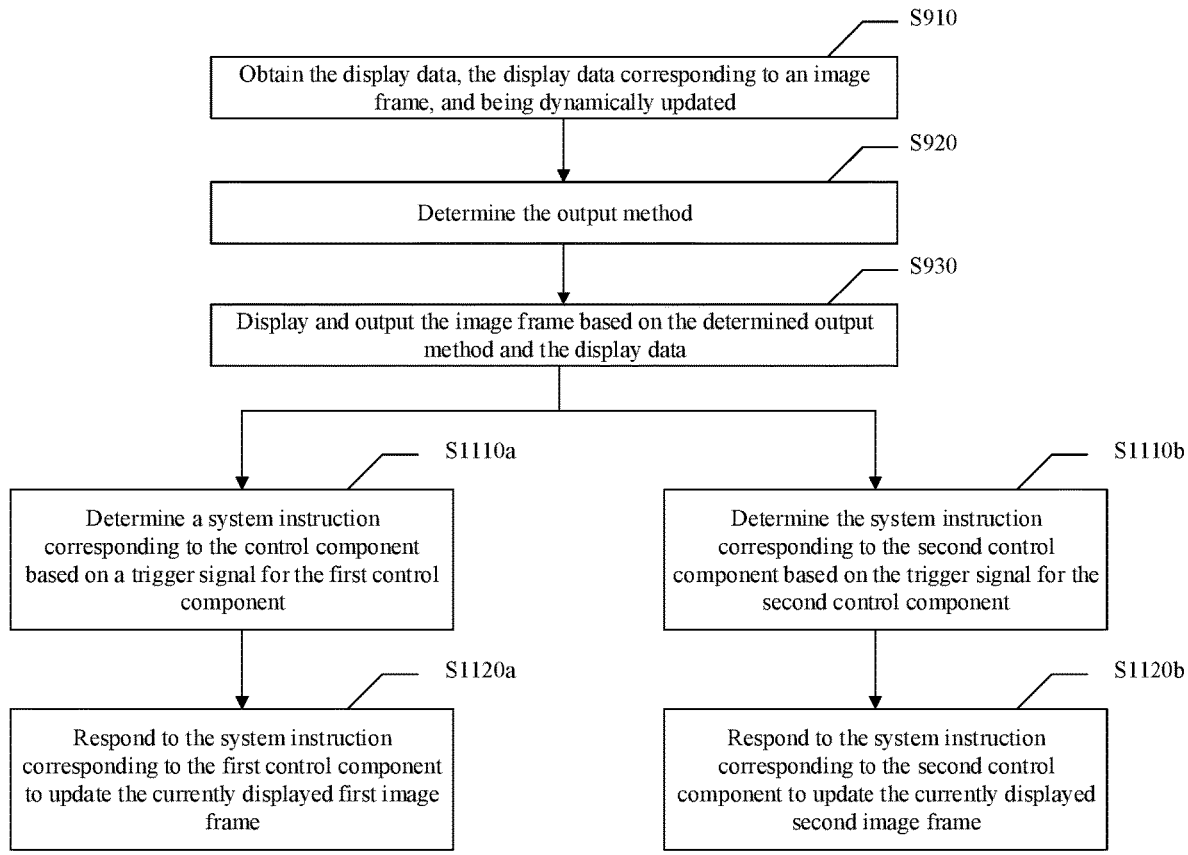
FIG. 11 illustrates a schematic flowchart of an information processing method according to other embodiments of the present disclosure.

FIG. 11 illustrates a schematic flowchart of an information processing method according to other embodiments of the present disclosure.

As shown in FIG. 11, the method includes the processes S910 to S930 and the processes S1110a to S1120a or the processes S1110b to S1120b.

At S1110a, the method includes determining a system instruction corresponding to the control component based on a trigger signal for the first control component. The trigger signal for the first control component may be the trigger signal generated by a clicking operation for the first control component through an input device. The input device may include, for example, a touch screen, a touchpad, a mouse, etc., of the first electronic device.

At S1120a, the method includes responding to the system instruction corresponding to the first control component to update the currently displayed first image frame.

For example, the system instruction corresponding to the first control component may be transmitted through the connection channel with the second electronic device. As such, the second electronic device may respond to the system instruction corresponding to the first control component to update the display data of the screen of the second electronic device.

In another example, the display data is the display data of the recording scenario of the second electronic device (e.g., a smartphone). The first electronic device may separate the image and the recording control component of the recording scenario, display the image in the first electronic device, and add and display the first control component to the area that does not overlap with the image in the first electronic device. The recording may start by clicking the first control component. For example, by clicking the system instruction generated by the first control component of the first electronic device, the system instruction may be transmitted to the second electronic device through the connection channel. After the second electronic device receives and executes the system instruction to perform the recording operation (e.g., photographing), the display data of the second electronic device may be updated. For example, a photographed image may be saved in a storage space of the second electronic device, and the current preview image of the second electronic device may be updated. At this point, the updated preview image may be used as the updated display data and transmitted to the first electronic device through the connection channel. The first electronic device may continue to separate an image and a control component of the updated display data, display the image in the first electronic device, and add and display the first control component to the area that may not overlap with the image of the first electronic device. In other embodiments, the first electronic device may not need to add the first control component again but continue to use the first control component added and displayed before the display data is updated.

The connection channel configured to transmit the system instruction may include a plurality of sub-channels. The first electronic device may transmit the system instruction to the second electronic device through a third sub-channel of the plurality of sub-channels. The third sub-channel may be configured to, for example, transmit the system instruction. The system instruction may also be transmitted through the first sub-channel or the second sub-channel.

In other embodiments, at S1110b, the method includes determining the system instruction corresponding to the second control component based on the trigger signal for the second control component.

For example, a trigger signal for the second control component may be an input coordinate or an input operation received through the input device. The input device may be, for example, the touch screen, the touchpad, the mouse, etc., of the first electronic device.

In another example, the display data may be data displayed when the second electronic device (e.g., a smartphone) during a recording operation. When a second image frame is outputted by the second output method, the second image frame may include an image and a control component of the recording scenario. The recording may start by clicking the second control component. For example, a system instruction may be generated by clicking the second control component of the first electronic device. The system instruction may be then transmitted to the second electronic device through the connection channel, such that the second electronic device may receive the system instruction and execute the recording operation (e.g., photographing).

Before the system instruction is transmitted to the second electronic device through the connection channel, the first electronic device first may convert the input coordinate into a conversion coordinate of the display area of the second image frame displayed and outputted based on the second display data. For example, the input operation has an input coordinate (a, b) in the first electronic device. This input coordinate may be converted into the conversion coordinate (c, d) in the display area of the second image frame of the first electronic device. Since the display area of the second image frame of the first electronic device may correspond to the current interface of the screen of the second electronic device, the conversion coordinate may correspond to the current interface of the screen of the second electronic device.

The conversion coordinate and the input operation may be transmitted through the connection channel connected with the second electronic device, such that the second electronic device may determine a click operation for the second control component based on the conversion coordinate and the input operation to determine the system instruction corresponding to the second control component. For example, by transmitting the conversion coordinate (c, d) to the second electronic device, the second electronic device may determine that the click operation on the first electronic device may be the click operation for the recording control component based on the conversion coordinate. Therefore, the system instruction may be determined as the recording instruction, and the second electronic device may execute the system instruction to perform the recording operation (e.g., photographing).

The connection channel configured to transmit the conversion coordinate and the input operation may include the plurality of sub-channels. The first electronic device may transmit the conversion coordinate and the input operation to the second electronic device through a fourth sub-channel of the plurality of sub-channels. The conversion coordinate and the input operation may be also transmitted through the first sub-channel, the second sub-channel, or the third sub-channel.

At S1120b, the method includes responding to the system instruction corresponding to the second control component to update the currently displayed second image frame.

For example, by responding to the system instruction corresponding to the second control component, the second electronic device may update the display data of the screen of the second electronic device. As such, the currently displayed second image frame of the first electronic device may be updated based on an update operation of the screen of the second electronic device.

In another example, after the second electronic device executes the system instruction to perform the recording operation (e.g., photographing), the display data of the second electronic device may be updated. For example, a photographed image may be saved in the storage space of the second electronic device, and the current preview image of the second electronic device may be updated. The updated preview image may include, for example, the control component. Then, the updated preview image may be used as the updated display data and transmitted to the first electronic device through the connection channel. The first electronic device may continue to output the second image frame corresponding to the updated display data based on the second output method. The updated second image frame displayed in the first electronic device may include, for example, the second control component.

In some embodiments, after the output method is determined, the first electronic device may display/output the display data received in real-time based on the determined output method until the second electronic device is outside the connection range (e.g., the wireless connection range).

For example, the first electronic device and the second electronic device may establish a connection through a low-power consumption method. The low-power consumption method may include, for example, the Bluetooth broadcast method. After the first electronic device and the second electronic device establish the connection, the first electronic device may create a connection channel. The connection channel may include, for example, a WIFI direct connection channel. When the first electronic device and the second electronic device transmit the image frame using the connection channel, the output method of the image frame may be determined at the beginning, for example, the output method may be the first output method or the second output method. Therefore, first electronic device subsequently receives the display data of the second electronic device in real-time, the first electronic device may continue to output the image frame corresponding to the display data subsequently received in real-time based on the initially determined output method. If the second electronic device is outside the connection range, the second electronic device may be disconnected from the first electronic device. If the second electronic device returns to the connection range thereafter, and the second electronic device is reconnected to the first electronic device, the first electronic device may re-receive display data of the second electronic device and re-determine the output method. After the devices are reconnected, the accuracy of the output method may be improved.

In another example, after the second electronic device and the first electronic device re-establish the connection, the first electronic device may determine whether the second electronic device is the previous device by using the device identification of the second electronic device. If the device identification identifies that the second electronic device is the previous device, the first electronic device may display/output the image frame obtained in real-time based on the output method determined before. As such, the first electronic device may not need to re-determine the output method to save computation resource and processing efficiency.

In some embodiments, the present disclosure further provides an electronic device including an operating system and a screen projection function. The screen projection function may be a functional module of the operating system, or an application having the screen projection function installed based on the operating system. The electronic device may realize the method described in FIGS. 8-11. For example, the electronic device may realize the processes S910 to S930 as shown in FIG. 9 and the processes S1110a to S1120a or S1110b to S1120b as shown in FIG. 11.

In other embodiments, the present disclosure provides a computing device including a display functional module and a screen projection functional module. The screen projection functional module is configured to realize the method described in FIGS. 8-11, for example, realize the process S910 to S930 as shown in FIG. 9, and the processes S1110a to S1120a or S1110b to S1120b as shown in FIG. 11.

Figure 12:
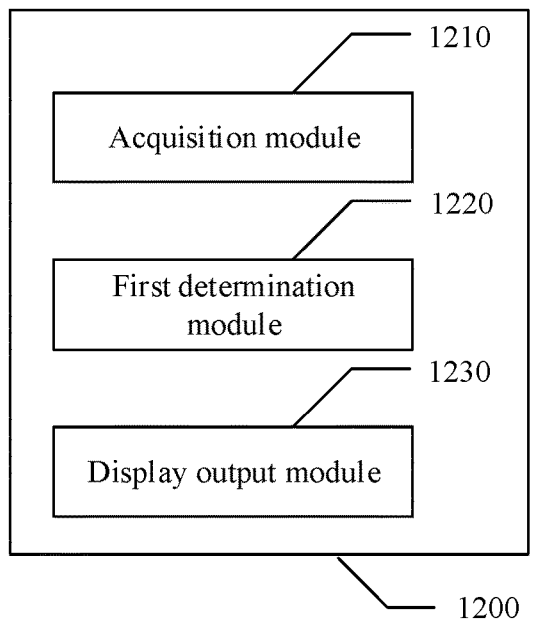
FIG. 12 illustrates a schematic block diagram of an information processing device according to some embodiments of the present disclosure.

FIG. 12 illustrates a schematic block diagram of an information processing device according to some embodiments of the present disclosure.

As shown in FIG. 12, an information processing device 1200 includes an acquisition module 1210, a first determination module 1220, and a display output module 1230.

The acquisition module 1210 may be configured to receive display data. The display data corresponds to an image frame. The display data is dynamically updated. In some embodiments, the acquisition module 1210, for example, may execute the process S910 described in the above-described FIG. 9, which is not repeated here.

The first determination module 1220 may be configured to determine a output method. In some embodiments, the first determination module 520, for example, maybe configured to execute the process S920 in the above-described FIG. 9, which is not repeated here.

The display output module 1230 may be configured to display/output the image frame based on the determined output method and the display data. In some embodiments, the display output module 1230, for example, maybe configured to execute the process S930 in the above-described FIG. 9, which is not repeated here.

In some embodiments, if the determined output method is the first output method, the first electronic device may display at least one first control component and display/output the first image frame based on the first display data. If the determined output method is the second output method, the first electronic device may display/output the second image frame based on the second display data. The second image frame may include at least a second control component. The result of triggering the first control component is the same as the result of triggering the second control component.

In some embodiments, a display area for displaying at least one first control component does not overlap with a display area for displaying/outputting the first image frame based on the first display data.

In some embodiments, receiving the display data may include receiving the display data of the screen of the second electronic device in real-time based on the connection channel with the second electronic device.

In some embodiments, determining the output method may include obtaining configuration information of the second electronic device based on the connection channel with the second electronic device. If the configuration information indicates that the second electronic device determines the system instruction based on the input gesture, the output method may be determined as the first output method. If the configuration information indicates that the second electronic device determines the system instruction based on the control component, the output method may be determined as the second output method.

In some embodiments, if the first display data and the second display data are the same, displaying/outputting the first image frame based on the first display data may further include separating the control component and image of the image frame corresponding to the display data, and displaying/outputting the image.

Figure 13:
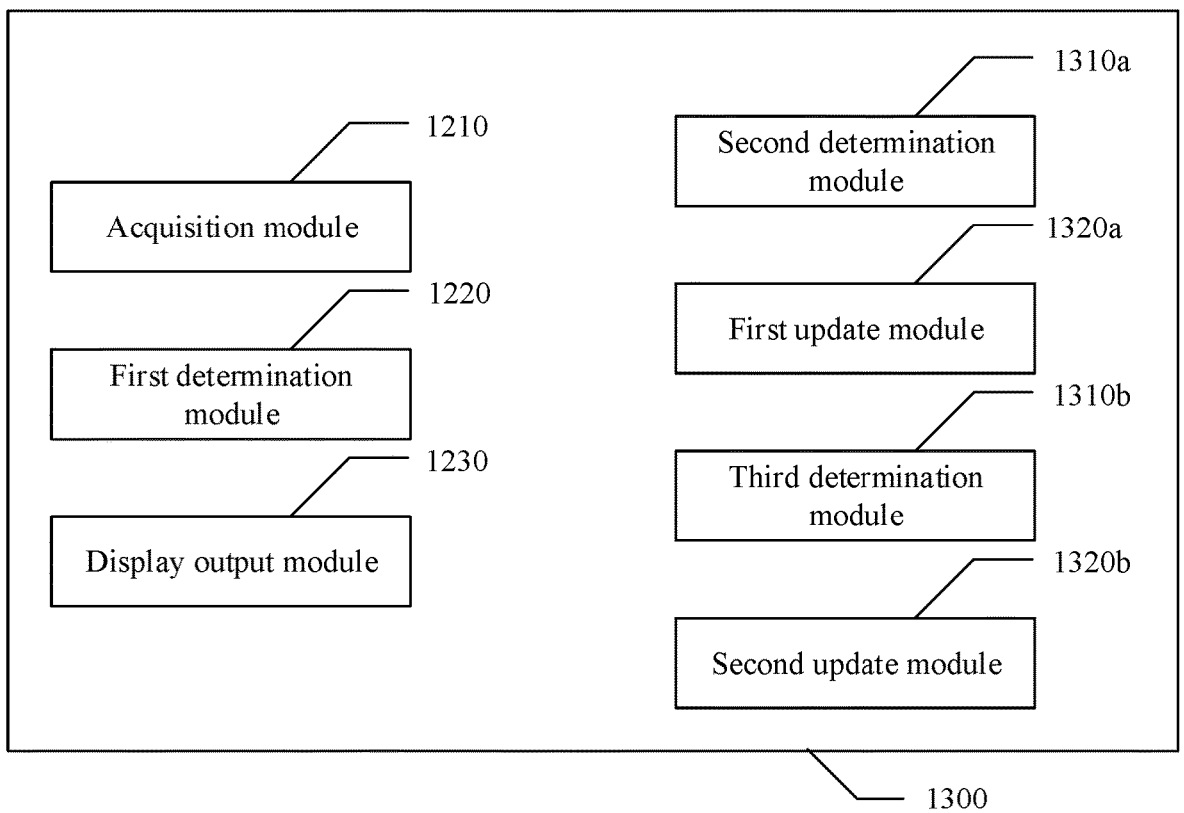
FIG. 13 illustrates a schematic block diagram of an information processing device according to other embodiments of the present disclosure.

FIG. 13 illustrates a schematic block diagram of an information processing device according to other embodiments of the present disclosure.

As shown in FIG. 13, an information processing device 1300 includes an acquisition module 1210, a first determination module 1220, a display output module 1230, a second determination module 1310a, a first update module 1320a, a third determination module 1310b, and a second update module 1320b.

The second determination module 1310a may be configured to determine the system instruction corresponding to the first control component based on the trigger signal for the first control component. In some embodiments, the second determination module 1310a, for example, may execute the process 1110a in the above-described FIG. 11, which is not repeated here.

The first update module 1320a may be configured to respond to the system instruction corresponding to the first control component to update the currently displayed first image frame. In some embodiments, the first update module 1320a, for example, may execute the process S1120a in the above-described FIG. 11, which is not repeated here.

The third determination module 1310b may be configured to determine the system instruction corresponding to the second control component based on the trigger signal for the second control component. In some embodiments, the third determination module 1310b, for example, may execute the process S410b in the above-described FIG. 11, which is not repeated here.

The second update module 1320b may be configured to respond to the system instruction corresponding to the second control component to update the currently displayed second image frame. In some embodiments, the second update module 1320b, for example, may execute the process S420b in the above-described FIG. 11, which is not repeated here.

In some embodiments, a trigger signal for the first control component may be a trigger signal generated by a click operation for the first control component. Responding to the system instruction corresponding to the first control component to update the currently displayed first image frame includes the following processes. The system instruction corresponding to the first control component is transmitted through the connection channel with the second electronic device. Subsequently, the system instruction causes the second electronic device to respond to the system instruction corresponding to the first control component to update the display data of the screen of the second electronic device. In other embodiments, the trigger signal for the second control component may be an input coordinate and an input operation received through the input device. Determining the system instruction corresponding to the second control component based on the trigger signal for the second control component may include the following processes. The input coordinate is converted into a conversion coordinate of the display area of the displayed second image frame based on the second display data. Then, the conversion coordinate and the input operation are transmitted through the connection channel with the second electronic device. As such, the second electronic device may determine the click operation for the second control component based on the conversion coordinate and the input operation to determine the system instruction corresponding to the second control component. Responding to the system instruction corresponding to the second control component to update the currently displayed second image frame may include the following processes. The second electronic device may respond to the system instruction corresponding to the second control component to update the display data of the screen of the second electronic device.

In some embodiments, after determining the output method, the first electronic device may display/output the display data received in real-time based on the output method, until the second electronic device is outside the connection range.

In some embodiments, any number of modules, submodules, units, and subunits, or at least some functions of any number thereof, may be implemented in one module. Anyone or more of the modules, sub-modules, units, and sub-units may be divided into a plurality of modules for implementation. Anyone or more of the modules, sub-modules, units, and sub-units may be at least partially implemented as a hardware circuit, such as a field-programmable gate array (FPGA), a programmable logic array (PLA), a system-on-chip, a system-on-substrate, a system-on-package, an application-specific integrated circuit (ASIC), or hardware or firmware in any other reasonable way that integrates or encapsulates the circuit, or can be implemented by anyone of these implementations or an appropriate combination of software, hardware, and firmware. Alternatively, one or more of the modules, sub-modules, units, and sub-units according to embodiments of the present disclosure may be at least partially implemented as a computer program module, and when the computer program module is run, corresponding functions may be performed.

For example, any number of the acquisition module 1210, the first determination module 1220, the display output module 1230, the second determination module 1310a, the first update module 1320a, the third determination module 1310b, and the second update module 1320b may be implemented in one module. In some embodiments, any one or more of these modules may be divided into a plurality of modules for implementation. In some embodiments, at least a partial function of one or more of these modules may be combined with at least a partial function of other modules and are implemented in one module. In some embodiments, at least one of the acquisition module 1210, the first determination module 1220, the display output module 1230, the second determination module 1310a, the first update module 1320a, the third determination module 1310b, or the second update module 1320b may at least partially be implemented as a hardware circuit, for example, a field-programmable gate array (FPGA), a programmable logic array (PLA), a system-on-chip, a system-on-substrate, a system-on-package, an application-specific integrated circuit (ASIC), or hardware or firmware in any other reasonable way that integrates or encapsulates the circuit, or anyone of these implementations or an appropriate combination of software, hardware, and firmware. At least one of the acquisition module 1210, the first determination module 1220, the display output module 1230, the second determination module 1310a, the first update module 1320a, the third determination module 1310b, or the second update module 1320b may be at least partially implemented as a computer program module. When the computer program module is run, the corresponding function may be performed.

Figure 14:
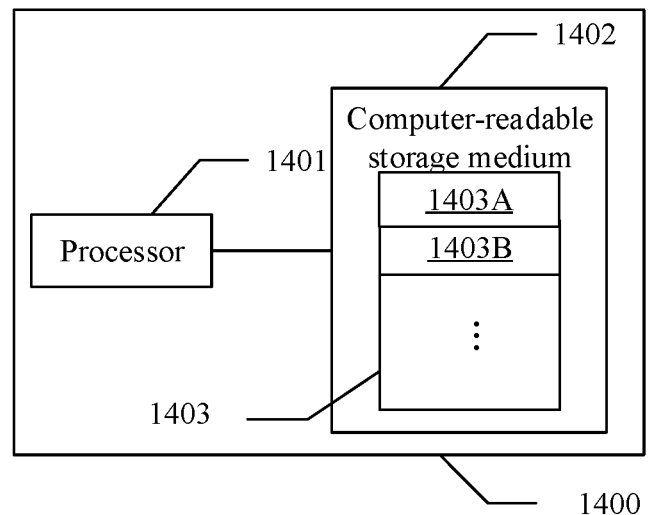
FIG. 14 illustrates a schematic block diagram of a computer configured to realize the information processing according to some embodiments of the present disclosure.

FIG. 14 illustrates a schematic block diagram of a computer system configured to realize the information processing according to some embodiments of the present disclosure. FIG. 14 only shows an example of the computer system, which does not limit a function and an application area of embodiments of the present disclosure.

As shown in FIG. 7, a computer system 1400 for realizing the information processing includes a processor 1401, and a computer-readable storage medium 1402. The system 1400 may execute the method of embodiments of the present disclosure.

In some embodiments, the processor 1401 may include, for example, a general-purpose microprocessor, an instruction set processor, and/or a chipset and/or a special-purpose microprocessor (e.g., application-specific integrated circuits (ASIC)), etc. The processor 1401 may further include an onboard memory configured to caching purpose. The processor 1401 may be a single processor or a plurality of processing units configured to execute different actions of the method flow according to embodiments of the present disclosure.

The computer-readable storage medium 1402, for example, may include any medium that can include, store, send, broadcast, or transmit an instruction. For example, the computer-readable medium may include but is not limited to an electric, magnetic, optical, electromagnetic, infrared, or semiconductor system, device, device, or propagation medium. The computer-readable storage medium may include, for example, a magnetic storage device, such as a magnetic tape or a hard disk (HDD); an optical storage device, such as an optical disk (CD-ROM); a memory, such as a random access memory (RAM) or flash memory; and/or wired/wireless communication link.

The computer-readable storage medium 1402 may include a computer program 1403. The computer program may include code/computer-executable instruction. when the computer program 1403 is executed by the processor 1401, the computer program 1403 may cause the processor 1401 to execute the method or any other variations according to embodiments of the present disclosure.

The computer program 1403 may be configured to include, for example, computer program code of the computer program module. For example, in some embodiments, the code of the computer program 1403 may include one or more program modules, such as 1403A, 1403B, . . . . The division method and number of the module are not fixed. Those of skill in the art may use a suitable program module or program module combination according to specific requirements. When this program combination is executed by the processor 1401, the program combination causes the processor 1401 to execute the method or any other variations according to embodiments of the present disclosure.

In some embodiments, at least one of the acquisition module 1210, the first determination module 1220, the display output module 1230, the second determination module 1310a, the first update module 1320a, the third determination module 1310b, or the second update module 1320b may be implemented as the computer program module as shown in FIG. 14. When the computer program is executed by the processor 1401, the processor 1401 may realize the above-described corresponding operations.

The present disclosure also provides a computer-readable storage medium. The computer-readable storage medium may be included in the device/device/system of the above-described embodiments, or exist alone without being installed in the device/device/system. the above-described computer-readable storage medium may carry one or more programs. When the one or more programs are executed, the information processing method is realized.

According to embodiments of the present disclosure, the computer-readable medium may be a computer-readable signal medium or a computer-readable storage medium or any combination thereof. The computer-readable storage medium may be, for example, but not limited to, an electrical, magnetic, optical, electromagnetic, infrared, or semiconductor system, device, or component, or any combination thereof. More specific examples of computer-readable storage media may include, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, and the program may be used by or in combination with an instruction execution system, device, or component. In the present disclosure, a computer-readable signal medium may include a data signal propagated in baseband or as a part of a carrier wave, and the computer-readable program code is carried therein. This propagated data signal can take many forms, including but not limited to electromagnetic signals, optical signals, or any suitable combination of the foregoing. The computer-readable signal medium may also be any computer-readable medium other than the computer-readable storage medium. The computer-readable medium may send, propagate, or transmit the program for use by or in combination with the instruction execution system, device, or component. The program code contained on the computer-readable medium can be transmitted by any suitable medium, including but not limited to wireless, wired, optical cable, radio frequency signals, etc., or any suitable combination of the foregoing.

The flowcharts and block diagrams in the accompanying drawings illustrate a possible implementation architecture, a function, and an operation of the system, method, and computer program product according to embodiments of the present disclosure. At this point, each block in the flowchart or block diagram may represent a module, a program segment, or a part of code, and the above-described module, program segment, or part of code may include one or more executable instructions for realizing the specified logic function. In some alternative implementations, the functions marked in the block may also occur in a different order from the order marked in the drawings. For example, two blocks shown in succession may be executed substantially in parallel, or sometimes be executed in the reverse order, depending on the functions involved. Each block in the block diagram or flowchart and the combination of blocks in the block diagram or flowchart may be implemented by a dedicated hardware-based system that performs the specified functions or operations, or may be implemented by a combination of a dedicated hardware and computer instructions.

Embodiments of the present disclosure provide a file transmission method. The file transmission method may include the following processes. After a first electronic device establishes a communication link/connection with a second electronic device, the first electronic device may receive display data from the second electronic device through a first transmission channel. The display data is display data of the screen of the second device. The first electronic device may display an image corresponding to the display data in a first display area. The first electronic device may receive an input operation. If the input operation indicates a first input operation for dragging into the first display area. The first electronic device may transmit a first file corresponding to the first input operation to the second electronic device through a second transmission channel.

Figure 15:
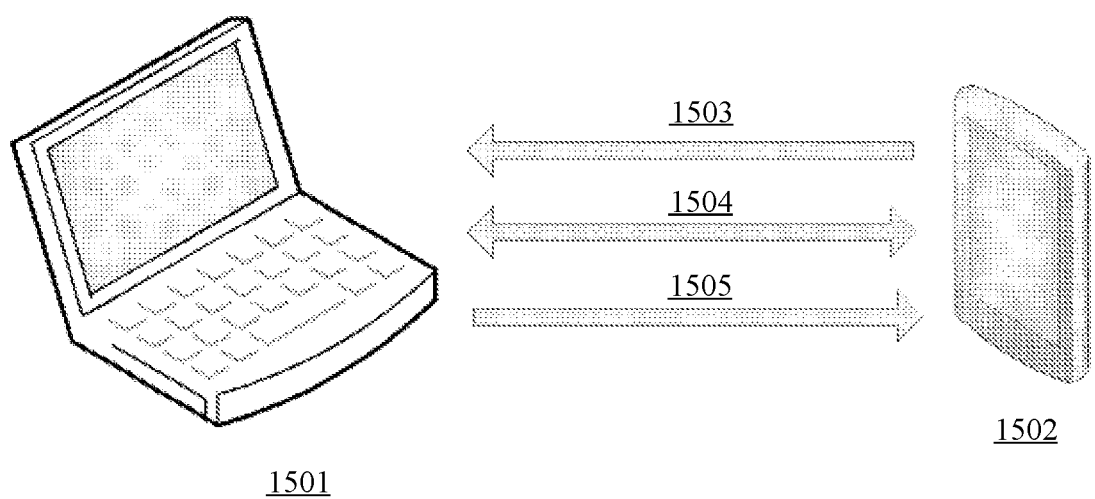
FIG. 15 illustrates a schematic application scenario of a file transmission method according to some embodiments of the present disclosure.

FIG. 15 illustrates a schematic application scenario of a file transmission method according to some embodiments of the present disclosure. FIG. 15 shows only an example of the application scenario of embodiments of the present disclosure to help those skilled in the art to understand the technical content of the present disclosure. Embodiments of the present disclosure may also be applied to another device, system, environment, or scenario.

As shown in FIG. 15, the file transmission method of embodiments of the present disclosure may be executed by a first electronic device 1501 to transmit a file between the first electronic device 1501 and a second electronic device 1502. Both of the first electronic device 1501 and the second electronic device 1502 have a screen, which may display an image interface. Both of the first electronic device 1501 and the second electronic device 1502 may have a communication circuit, for example, a Bluetooth circuit, a WIFI circuit, etc., which may realize data transmission with an external device. The first electronic device 1501 and the second electronic device 1502 may include but is not limited to an electronic device, such as a laptop, a tablet, a desktop, a smartphone, etc.

Various client terminal applications may be installed in the first electronic device 1501 and the second electronic device 1502. The terminal applications may include, for example, an image processing application, a communication application, a shopping application, a web page browsing application, a search application, a real-time communication tool, an email client terminal, etc.

A network connection may be established between the first electronic device 1501 and the second electronic device 1502. A plurality of transmission channels may be established between the first electronic device 1501 and the second electronic device 1502. The plurality of transmission channels may include a first transmission channel 1503, a second transmission channel 1504, a third transmission channel 1505, etc. The first transmission channel 1503 may be configured to, for example, transmit screen display data. The second transmission channel 1504 may be configured to, for example, transmit a file. The third transmission channel 1505 may be configured to, for example, transmit instruction information.

The second electronic device 1502 may transmit the display data of its screen to the first electronic device 1501 through the first transmission channel 1503. After receiving the display data from the second electronic device 1502 through the first transmission channel 1503, the first electronic device 1501 displays the image corresponding to the display data in a first display area of the screen of the first electronic device 1501. That is, a screen image of the second electronic device 1502 is projected on the screen of the first electronic device 1501. Therefore, the first display area may be referred to as a projection area.

The first electronic device 1501 may receive an input operation from a user for the screen of the first electronic device 1501. If the input operation indicates to drag a file of a non-projection area to the projection area, for example, to drag a file icon of the non-projection area to the projection area through a mouse, the first electronic device 1501 may transmit the file corresponding to the input operation to the second electronic device 1502 through a second transmission channel 1504. By performing an operation only on the screen of the first electronic device 1501, the file may be transmitted. User operation is simpler, and the file transmission is more convenient.

When performing the input operation, the first electronic device 1501 may further generate a control instruction or event information based on the input operation. The first electronic device 1501 may further transmit the control instruction or the event information to the second electronic device 1502 through the third transmission channel 1505.

Figure 16:
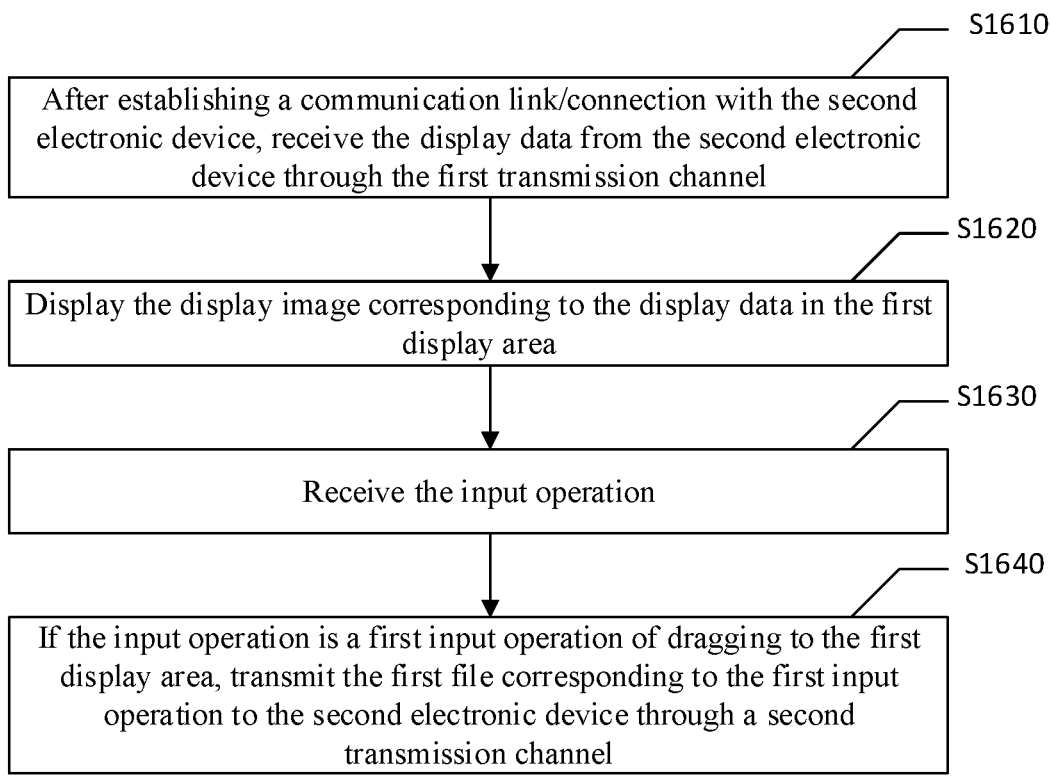
FIG. 16 illustrates a schematic flowchart of the file transmission method according to some embodiments of the present disclosure.

FIG. 16 illustrates a schematic flowchart of the file transmission method according to some embodiments of the present disclosure.

As shown in FIG. 16, the file transmission method includes processes S1610 to S1640.

At S1610, after establishing a communication link/connection with the second electronic device, the first electronic device receives the display data from the second electronic device through the first transmission channel. The display data is the display data of the screen of the second electronic device.

At S1620, the first electronic device displays the image corresponding to the display data in the first display area.

At S1630, the first electronic device receives the input operation.

At S1640, if the input operation is a first input operation of dragging to the first display area, the first electronic device transmits the first file corresponding to the first input operation to the second electronic device through a second transmission channel.

In some embodiments, the file transmission method may be executed by the first electronic device. For example, to further describe embodiments of the present disclosure, a laptop may be used as the first electronic device, and a smartphone may be used as the second electronic device.

After the smartphone establishes the communication link/connection with the laptop, display data of the screen of the smartphone may be transmitted to the laptop in real-time through the first transmission channel. After receiving the display data, the laptop may generate a display interface based on the received display data of the smartphone and display data of the laptop and displays the display interface on the screen of the laptop.

Figure 17:
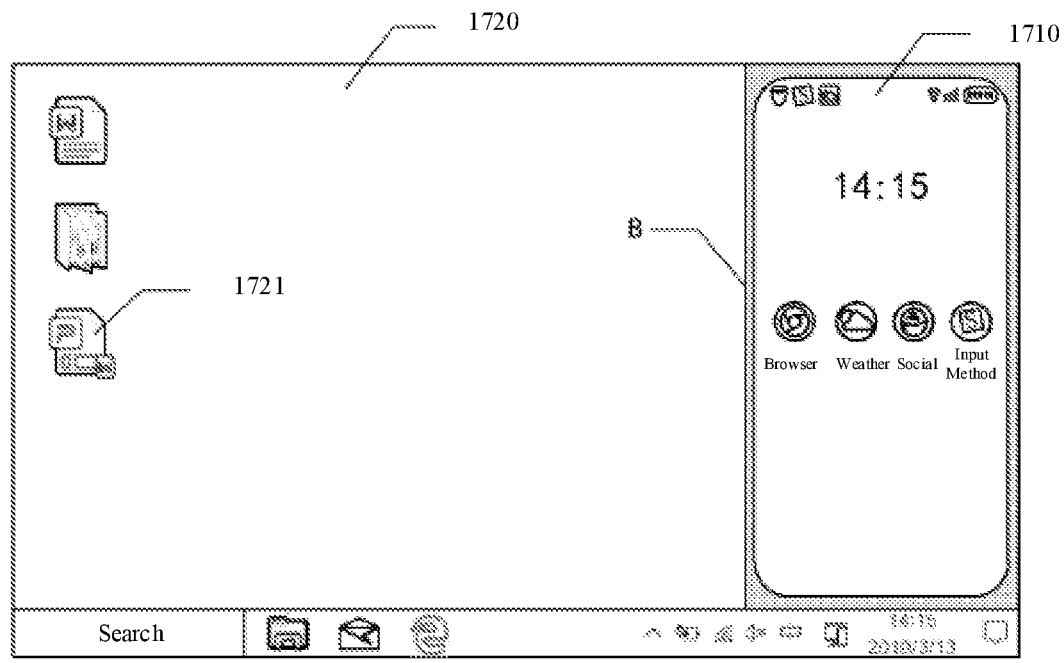
FIG. 17 illustrates a schematic diagram of a display interface of an electronic device according to some embodiments of the present disclosure.

FIG. 17 illustrates a schematic diagram of a display interface of a first electronic device according to some embodiments of the present disclosure.

As shown in FIG. 17, the display interface includes a first display area 1710 and a second display area 1720. An edge B may exist between the first display area 1710 and the second display area 1720. The first display area 1710 may be configured to display a image corresponding to the display data received from the smartphone, that is, display the image on the screen of the smartphone. the second display area 1720 may be configured to display a image corresponding to the display data of the laptop. The above-described operation is equivalent to project the image of the screen of the smartphone on the screen of the laptop in real-time. Thus, the image in the first display area 1710 is synchronized to the image of the screen of the smartphone. Any changes in the image on the screen of the smartphone may be synchronized and updated in the first display area 1710. Since the image of the smartphone takes a portion of the screen of the laptop, the image of the laptop may only display a partial image area. In other embodiments, the image covered by the image of the smartphone may be adjusted to the second display area for display through a strategy of adjusting image position.

In some embodiments, the laptop may receive the input operation. The input operation may be received, for example, through a mouse, a touch screen, a keyboard, etc. If the input operation is the first input operation indicating dragging the file in the second display area 1720 across the border B into the first display area 1710, the first electronic device may transmit the first file corresponding to the first input operation to the second electronic device. The first file may include, for example, an image, a document, a file, etc.

For example, the user may drag a file icon 1721 in the second display area 1720 into the first display area 1710 through the mouse or touch screen, and end dragging operation in the first display area 1710. Ending the dragging operation may be realized, for example, when the user releases figures from the mouse or moves figures away from the touch screen. A start point of the dragging operation is in the second display area 1720, and the endpoint is in the first display area 1710. This process indicates that the file in the second display area 1720 is dragged into the first display area 1710. Then, the laptop may transmit the file corresponding to the file icon 1721 to the smartphone through the second transmission channel. In another example, the user may first copy the file icon 1721 in the second display area 1720 through copy short-cut keys "Ctrl+C" on the keyboard. Then, when moving the cursor into the first display area 1710, the user may press down past short-cut keys "Ctrl+V" of the keyboard in the first display area. During this process, the file in the second display area 1720 is dragged into the first display area 1710, then the laptop may transmit the file corresponding to the file icon 1721 to the smartphone through the second transmission channel.

In some embodiments, by projecting the screen image of the second electronic device on the screen of the first electronic device for display, the user may only perform the operation on the screen of the first electronic device to realize the file transmission between the first electronic device and the second electronic device. The user operation is simpler, and file transmission is more convenient.

In some embodiments, the input operation may include an input position and an input gesture. If the input position is in the first display area 1710, the first electronic device may determine a conversion position based on the input position. By transmitting the conversion position and the input gesture to the second electronic device through the third transmission channel, the second electronic device may respond to the input gesture based on the conversion position.

In some embodiments, the input position may be, for example, a real-time position of the cursor during the input operation. The input position may be a position of the cursor relative to the whole image of the first electronic device. That is, the position is a position coordinate of a coordinate system created based on the whole image of the first electronic device.

The conversion position may indicate, for example, a position of the cursor relative to the first display area, that is, a position coordinate in a coordinate system created based on the first display area. The position coordinate of the first display area and the position coordinate of the screen of the smartphone correspond to each other. For example, a conversion position of a point at an upper corner of an image in the first display area is (X1, Y1), then, a position of the image on the screen image of the smartphone may also be (X1, Y1).

The input event may include, for example, clicking, touching, pressing, dragging, releasing, etc.

In some embodiments, the input position is in the first display area 1710. The conversion position is determined based on the input position. When this operation is executed, the coordinate conversion may only be performed during executing the effective input gesture. For example, during executing a touching operation, the cursor is in the first display area 1710, then the coordinate conversion may be performed. In another example, during executing a dragging operation, the cursor enters and stays in the first display area 1710, then the coordinate conversion may be performed. If the cursor only enters the first display area 1710 and moves out, then, no effective input gesture may be generated, and the coordinate conversion may not be performed.

In some embodiments, the first electronic device may transmit the conversion position and input gesture to the second electronic device through the third transmission channel, such that the second electronic device may respond to the input gesture based on the conversion position. After the input gesture of the laptop is transmitted to the smartphone, the smartphone may generate a corresponding operation according to a preset rule. For example, the input gesture may be a double-click gesture. A conversion position of the double-click gesture may be (X2, Y2). After the double-click gesture and the conversion position are transmitted to the smartphone, the smartphone may generate a double-click operation at a position with a coordinate of (X2, Y2) on the screen. If an image icon of an application is at the position, the application may be opened by double-clicking. In another example, the display content of the first display area may be the main screen interface of the smartphone. The input gesture may be to drag the image icon of the main screen interface in the first display area to a position at the left border of the first display area and stay.

At the same time, the drag gesture and the corresponding conversion position may be transmitted to the smartphone in real-time. Then, the smartphone may correspondingly control the corresponding image icon to be dragged to the left border, and scroll the display interface from the main screen interface to an adjacent "negative one screen" interface on the left. At the same time, the first display area on the laptop may be synchronized to the "negative one screen" interface.

In some embodiments, the file transmission method may further include, in response to the input operation being a second input operation indicating of moving out of the first display area, receiving a second file from the second electronic device through the first transmission channel. The second file may include, for example, an image, a document, a file, etc.

Figure 18:
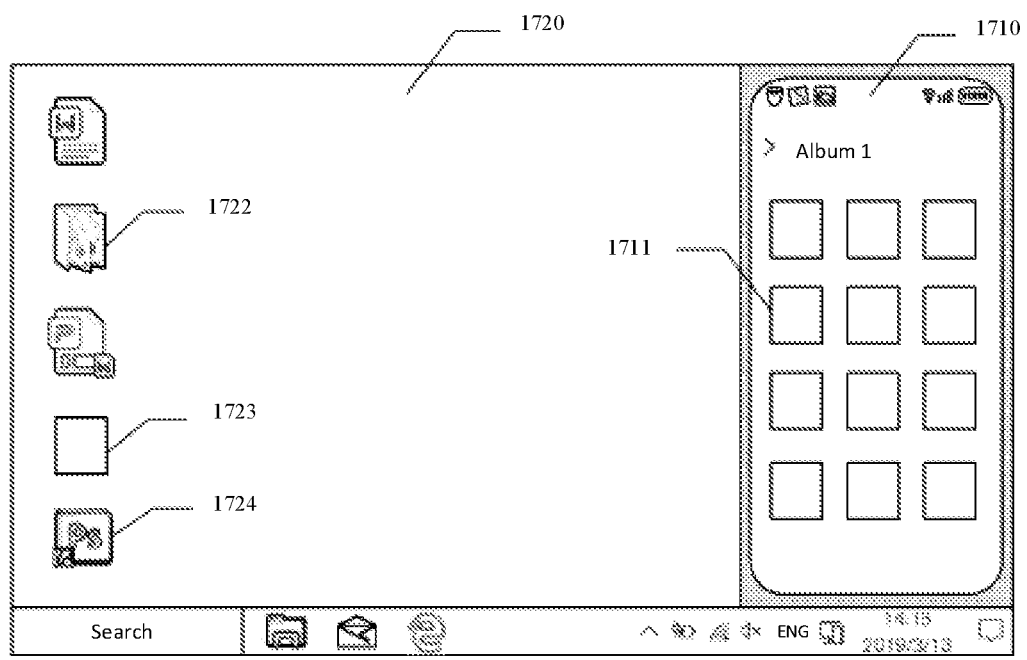
FIG. 18 illustrates a schematic diagram of the display interface of the electronic device according to other embodiments of the present disclosure.

FIG. 18 illustrates a schematic diagram of the display interface of the first electronic device according to other embodiments of the present disclosure.

As shown in FIG. 18, for example, the second input operation may include dragging an image 1711 of the first display area 1710 into the second display area 1720 and ending the dragging operation in the second display area 1720. During this process, a start point of the dragging operation is in the first display area 1710, and an endpoint is in the second display area 1720. That is, the image 1711 is moved out from the first display area 1710 into the second display area 1720. During dragging the image, the laptop may transmit the dragging operation and the conversion position to the smartphone. Thus, the smartphone may determine a dragged file and a storage position of the file according to the position of the start point of the dragging gesture and the current image. When the dragging gesture is completed, the smartphone may obtain the image 1711 from the corresponding storage position, and transmit the image 1711 to the laptop through the second transmission channel. The laptop may receive and save the image 1711 transmitted by the smartphone.

During the above-described process, the laptop may determine whether the cursor is across the border from the first display area 1710 and moves to the second display area 1720 during the dragging. If yes, the laptop may transmit a control instruction to the smartphone to control the smartphone to transmit the image 1711 to the laptop. In addition, during the above-described process, the laptop may not need to determine whether the cursor is across the border from the first display area 1710 and moves to the second display area 1720 during the dragging. Since the laptop may transmit the dragging gesture and the conversion position to the smartphone in real-time, the smartphone may determine whether the endpoint of the dragging operation is in the first display area 1710 according to the received information. In response to the endpoint being not in the first display area 1710, the smartphone may need to transmit the file corresponding to the dragging operation to the laptop. The laptop may only need to receive the file transmitted from the smartphone.

In some embodiments, the file transmission method may further include saving the second file based on a predetermined file path. The predetermined file path may be a file path by default, or the predetermined file path may be a storage path determined based on the second input operation after moving out of the first display area.

For example, after receiving the second file from the smartphone, the laptop may save the second file based on the file path by default to save the second file in a default folder.

In another example, after receiving the second file from the smartphone, the laptop may save the second file based on the path determined by the second input operation to save the second file in a folder determined by the second input operation. In another example, the second input operation may be the dragging operation. The dragging operation may move the image 1711 out of the first display area 1710 and fall on a folder 1722 of the second display area 1720. A path corresponding to the folder 1722 may be, for example, "CAUsers\ Desktop\picture." Therefore, after receiving the second file the laptop may save the second file in the folder 1722 according to the above-described path.

Similarly, after receiving the first file from the laptop, the smartphone may save the first file in a default folder, or a folder determined by the first input operation. For example, the first input operation may be a dragging operation. The dragging operation may move an image 1723 of the second display area 1720 in an album 1 of the first display area 1710. Since the laptop may transmit a position of the dragging operation to the smartphone, the smartphone may determine the folder to save to the image 1723 according to the endpoint position of the dragging operation and the image of the current screen. The smartphone may also determine the file path corresponding to the folder. The file path corresponding to the folder may be, for example, "\sdcard\DCIM\album1." Therefore, after receiving the image 1723 transmitted by the laptop, the smartphone may save the image 1723 in the album 1 according to the above-described path.

In some embodiments, the file transmission method may further include determining an execution program for loading the second file based on the second input operation after moving out of the first display area, and starting the execution program to load the second file.

In some embodiments, if the endpoint of the second input operation is over an application image icon of the second display area, after receiving the second file from the smartphone, the laptop may save the second file in the default folder first. Then, the laptop may start the corresponding application and control the application to read and load the second file from the default folder.

For example, the second input operation may be a dragging operation. The dragging operation may move the image 1711 out of the first display area 1710 and move the image over an image icon of an image processing application 1724. Then, after receiving the image 1711 from the smartphone, the laptop may save the image 1711 in the default folder first, then start the image processing application 1724, and control the image processing application 1724 to load the image 1711.

Figure 19:
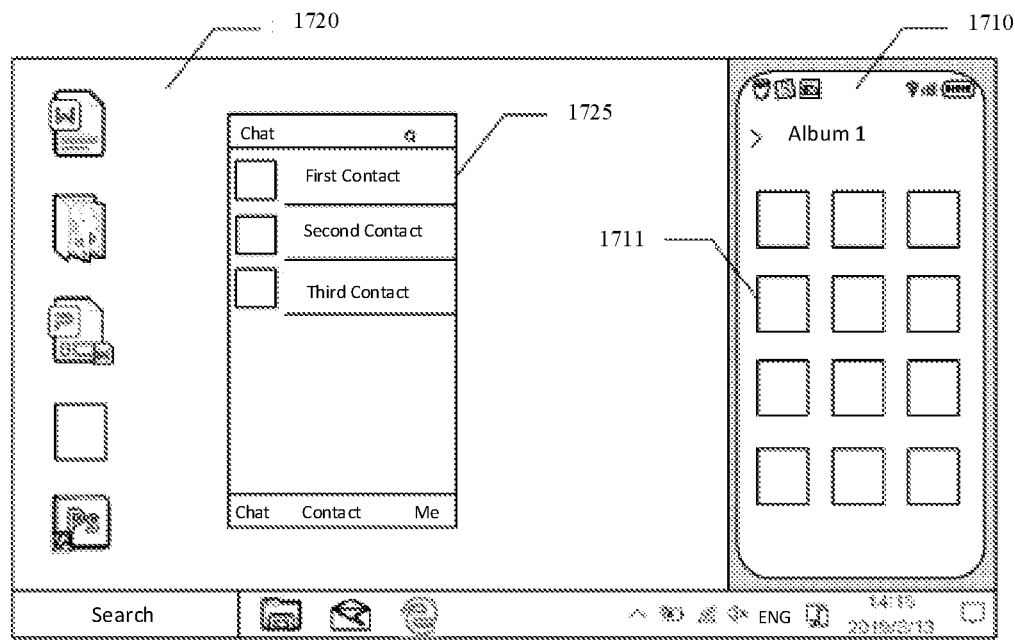
FIG. 19 illustrates a schematic diagram of the display interface of the electronic device according to other embodiments of the present disclosure.

FIG. 19 illustrates a schematic diagram of the display interface of the first electronic device according to other embodiments of the present disclosure.

As shown in FIG. 19, in another example, a communication window 1725 of a social media application may be displayed in the second display area 1720. A communication partner may be displayed in the chat window 1725. If the second input operation is the dragging operation, the dragging operation may move the image 1711 out of the first display area 1710 and move the image to an area corresponding to a first communication partner. Then, after receiving the image 1711 from the smartphone, the laptop may send the image 1711 to the first communication partner.

In some embodiments, the file transmission method may further include receiving the first input operation after moving in the first display area. The first input operation may include the input position and the input gesture. The file transmission method may further include processing the first input operation after moving in the first display area based on a processing strategy, and transmitting the input gesture of the first input operation and a processing result during the input gesture process to the second electronic device through the third transmission channel.

The processing strategy may include at least one strategy of converting the input position of the first input operation into the conversion position, if the first input operation stays at a first position longer than a first time, generating a clicking event, and if a stay position of the first operation belongs to the border of the first display area, generating a scrolling event. The first position may be any position of the first display area.

For example, the first input operation may be the dragging operation. During the dragging process, if the cursor enters the first display area 1710, the input position of the cursor may be converted into the conversion position, and the conversion position and the input gesture are transmitted to the smartphone. if the endpoint of the dragging operation falls over a first application image icon of the first display area, the smartphone may save the first file in the default folder according to the obtained information. Then, the smartphone may start the first application and load the first file using the first application. For example, the first file may be an image, and the first application may be an image viewer application. The smartphone may then start the image viewer and load the image. If the endpoint of the dragging operation falls in the communication window of the first display area, the smartphone may know a target communication partner corresponding to the endpoint of the dragging operation according to the obtained information. When receiving the first file from the laptop, the smartphone may send the first file to the target communication partner.

In another example, the first input operation may be the dragging operation. During the dragging process, the cursor stays over the image icon of the chat application of the first display area 1710 longer than a predetermined time (e.g., 2 seconds), a clicking event is generated. The laptop may transmit the clicking event and the staying position to the smartphone. Then, the smartphone may perform the clicking operation at the image icon of the chat application on the screen to open the chat application and display the chat list interface. At the same time, the first display area of the laptop may synchronically update and display the chat list interface. Since the dragging operation is not finished, the laptop may need to continue to respond to the dragging operation. If the cursor stays at an area of a first chat partner of the first display area 1710 for the predetermined time again during the dragging process, the clicking event is generated again. The laptop may transmit the clicking event and the staying position to the smartphone. The smartphone may perform the clicking operation in the area of the first chat partner on the screen of the smartphone to open a chat window with the first chat partner and display the chat window interface. At this point, the first display area of the laptop may synchronically update and display the chat window interface. In addition, the cursor may stay at a return key to return to the list interface or main screen interface, until the dragging operation is complete. The smartphone may determine a target receiving partner of the first file according to the position when the operation ends, and the image displayed on the screen of the smartphone.

In another example, the first input operation may be the dragging operation. During the dragging process, when the cursor stays in a left border area longer than the predetermined time (e.g., 2 seconds), the scrolling event is generated. The laptop may transmit the scrolling event and the staying position to the smartphone. Then, the smartphone generates a left swipe operation to scroll the current interface of the image of the screen of the smartphone to another interface corresponding to the left swipe operation. At this point, the first display area of the laptop may synchronically update and display another interface. Since the dragging operation is not finished, the smartphone may determine the target receiving partner of the file transmission according to the position when the operation ends, and the image displayed on the screen of the smartphone. In addition, the smartphone may be controlled to perform a gesture, such as right swipe, up swipe, down swipe, etc., through a staying operation during the dragging operation.

Based on the above-described method, during the dragging process, the laptop may monitor the position and gesture of the cursor in real-time to trigger a corresponding event, and notify the smartphone to perform a corresponding operation.

Embodiments of the present disclosure provide an electronic device. The electronic device may include an operating system and a screen projection module. The screen projection module may be a functional module integrated into the operating system, or an application having a screen projection function installed based on the operating system.

Figure 20:
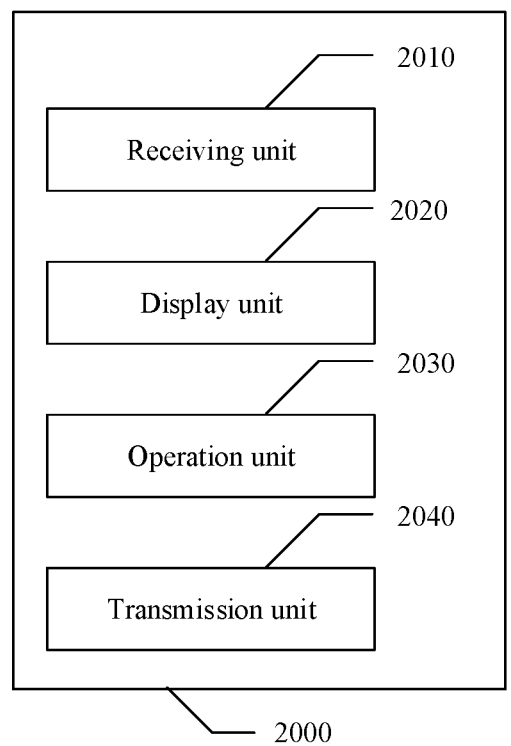
FIG. 20 illustrates a schematic block diagram of a screen projection module according to some embodiments of the present disclosure.

FIG. 20 illustrates a schematic block diagram of a screen projection module according to some embodiments of the present disclosure.

As shown in FIG. 20, a screen projection module 2000 includes a receiving unit 2010, a display unit 2020, an operation unit 2030, and a transmission unit 2040.

The receiving unit 2010 may be configured to receive display data from a second electronic device through a first transmission channel after a communication link/connection is established with the second electronic device. The display data may be the data to be displayed on the screen of the second electronic device.

The display unit 2020 may be configured to display a image corresponding to the display data in a first display area.

The operation unit 2030 may be configured to receive an input operation.

The transmission unit 2040 may be configured to transmit a first file corresponding to a first input operation to the second electronic device through a second transmission channel, when the input operation may be the first input operation indicating of moving into the first display area.

In some embodiments, the transmission unit may be further configured to receive a second file from the second electronic device through the first transmission channel, when the input operation is a second input operation indicating of moving out of the first display area.

In some embodiments, the input operation may include an input position and input gesture.

The screen projection module may further include a conversion unit and a sending unit. The conversion unit may be configured to determine a conversion position based on the input position when the input position is in the first display area. The sending unit may be configured to send the conversion position and the input gesture to the second electronic device through a third transmission channel to cause the second electronic device to respond to the input gesture based on the conversion position.

In some embodiments, the screen projection module may further include a storage module, which may be configured to save the second file based on the determined file path. The determined file path may be the default file path. In other embodiments, the determined file path may be a storage path determined based on the second input operation after the file is moved out of the first display area.

In some embodiments, the screen projection module may further include a start module. The start module may be configured to determine an execution program for loading the second file based on the second input operation after the file is moved out of the first display area, and start the execution program to load the second file.

In some embodiments, the screen projection module may further include a processing module, which may be configured to receive a first input operation after the file is moved into the first display area. The first input operation may include an input position and an input gesture. The processing module may be further configured to process the first input operation after the file is moved into the first display area based on a processing strategy, and transmit the input gesture of the first input operation and a processing result of the gesture input process to the second electronic device through a third transmission channel.

The processing strategy may include at least one strategy of converting the input position of the first input operation into the conversion position, if the first input operation stays at a first position longer than a first time, generating a clicking event, and if a stay position of the first operation belongs to the border of the first display area, generating a scrolling event. The first position may be any position of the first display area.

In some embodiments, any number of modules, submodules, units, and subunits, or at least some functions of any number thereof, may be implemented in one module. Anyone or more of the modules, sub-modules, units, and sub-units may be divided into a plurality of modules for implementation. Anyone or more of the modules, sub-modules, units, and sub-units may be at least partially implemented as a hardware circuit, such as a field-programmable gate array (FPGA), a programmable logic array (PLA), a system-on-chip, a system-on-substrate, a system-on-package, an application-specific integrated circuit (ASIC), or hardware or firmware in any other reasonable way that integrates or encapsulates the circuit, or can be implemented by anyone of these implementations or an appropriate combination of software, hardware, and firmware. Alternatively, one or more of the modules, sub-modules, units, and sub-units according to embodiments of the present disclosure may be at least partially implemented as a computer program module, and when the computer program module is run, corresponding functions may be performed.

For example, any number of the above-described modules and units may be implemented in one module. In some embodiments, any one or more of these modules may be divided into a plurality of modules for implementation. In some embodiments, at least a partial function of one or more of these modules may be combined with at least a partial function of other modules and are implemented in one module. In some embodiments, at least one of the above-described modules and units may at least partially be implemented as a hardware circuit, for example, a field-programmable gate array (FPGA), a programmable logic array (PLA), a system-on-chip, a system-on-substrate, a system-on-package, an application-specific integrated circuit (ASIC), or hardware or firmware in any other reasonable way that integrates or encapsulates the circuit, or anyone of these implementations or an appropriate combination of software, hardware, and firmware. At least one of the above-described modules and units may be at least partially implemented as a computer program module. When the computer program module is run, the corresponding function may be performed.

Figure 21:
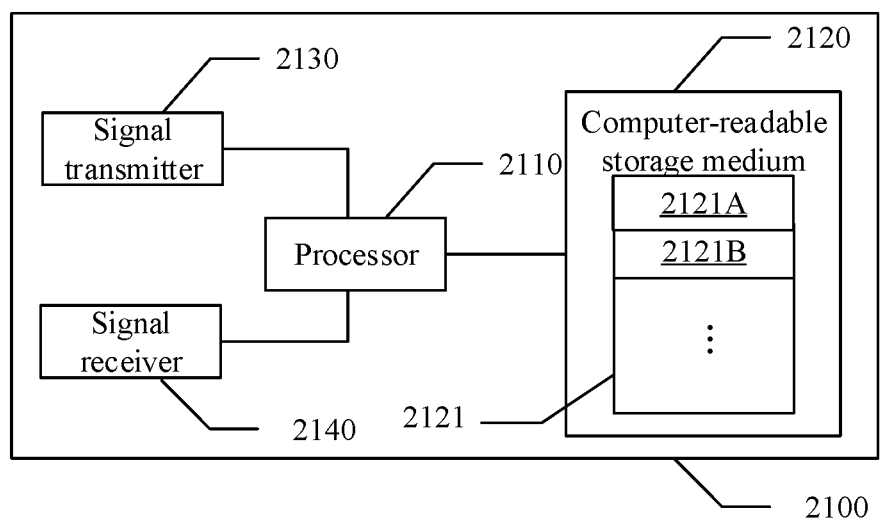
FIG. 21 illustrates a schematic block diagram of the electronic device according to other embodiments of the present disclosure.

FIG. 21 illustrates a schematic block diagram of the electronic device according to other embodiments of the present disclosure. FIG. 21 only shows an example of a computer system and should not limit the function and application scope of embodiments of the present disclosure.

As shown in FIG. 21, an electronic device 2100 includes a processor 2110, a computer-readable storage medium 2120, a signal transmitter 2130, and a signal receiver 2140. The electronic device may execute the method of embodiments of the present disclosure.

In some embodiments, the processor 2110 may include, for example, a microprocessor, an instruction set processor, a related chipset, a special purpose microprocessor (for example, an application-specific integrated circuit (ASIC)), etc. The processor 2110 may further include an onboard memory for caching purposes. The processor 2110 may include a single processing unit or a plurality of processing units configured to execute different actions of the method flow of embodiments of the present disclosure.

The computer-readable storage medium 2120 may include, for example, a non-volatile computer-readable storage medium, including but not limited to a magnetic storage device such as a magnetic tape or a hard disk (HDD), an optical storage device such as an optical disk (CD-ROM), a memory such as random access memory (RAM) or flash memory, etc.

The computer-readable storage medium 2120 may include a computer program 2121. The computer program 2121 may include code/computer-executable instruction that, when executed by the processor 2110, cause the processor 2110 to execute the method or any variation of embodiments of the present disclosure.

The computer program 2121 may be configured to have, for example, computer program code including a computer program module. For example, in an exemplary embodiment, the code in the computer program 2121 may include one or more program modules, for example, including 2121A, 2121B, . . . . The division method and the number of modules are not fixed. Those skilled in the art may use an appropriate program module or a program module combination according to specific requirements. When the program module combination is executed by the processor 2110, the processor 2110 may perform the method according to embodiments of the present disclosure or any variations thereof.

According to embodiments of the present disclosure, the processor 2110 may interact with the signal transmitter 2130 and the signal receiver 2140 to execute the method and any variations thereof of embodiments of the present disclosure.

The present disclosure also provides a computer-readable storage medium. The computer-readable storage medium may be included in the device/device/system described in the above embodiments or may exist alone without being assembled into the device/device/system. The above-described computer-readable storage medium stores one or more programs. When the above-described one or more programs are executed, the method of embodiments of the present disclosure is implemented.

In embodiments of the present disclosure, the computer-readable storage medium may be a non-volatile computer-readable storage medium, for example, may include but not limited to a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combination thereof. In the present disclosure, the computer-readable storage medium may be any tangible medium that contains or stores a program, and the program may be used by or in combination with an instruction execution system, device, or device.

The flowcharts and block diagrams in the accompanying drawings illustrate the possible implementation architecture, functions, and operations of the system, method, and computer program product according to various embodiments of the present disclosure. In this regard, each block in the flowchart or block diagram may represent a module, program segment, or a part of code, and the above-described module, program segment, or part of code include one or more executable instructions for realizing a specified logic function. In some alternative implementations, the functions marked in the block may also occur in a different order from the order marked in the drawings. For example, two blocks shown in succession can actually be executed substantially in parallel, or they can sometimes be executed in the reverse order, depending on the functions involved. Each block in the block diagram or flowchart, and the combination of blocks in the block diagram or flowchart, can be implemented by a dedicated hardware-based system that performs the specified function or operation, or can be realized by a combination of dedicated hardware and computer instructions.

Those skilled in the art may understand that various embodiments of the present disclosure and/or the features described in the claims may be grouped and/or combined in various ways, even if such groups or combinations are not explicitly described in the present disclosure. In particular, without departing from the spirit and teachings of the present disclosure, various embodiments of the present disclosure and/or features described in the claims may be grouped and/or combined in various ways. All these groups and/or combinations are within the scope of the present disclosure.

Although the present disclosure has been shown and described with reference to specific exemplary embodiments of the present disclosure, those skilled in the art should understand that without departing from the spirit and scope of the present disclosure defined by the appended claims and their equivalents, various changes in form and details may be made to the present disclosure. Therefore, the scope of the present disclosure should not be limited to the above-described embodiments, but should be defined not only by the appended claims, but also by the equivalents of the appended claims.

What is claimed is:

1. An information processing method, comprising:
    receiving, by a first electronic device, display data from a second electronic device, the display data corresponding to an image frame and being dynamically updated;
    determining an output method; and
    displaying the image frame based on the determined output method and the display data on the first electronic device, wherein:
        in response to the output method being a first output method, displaying at least a first control component and displaying a first image frame based on first display data; and
        in response to the output method being a second output method, displaying a second image frame based on second display data, and the second image frame includes at least a second control component, a result of triggering the first control component being consistent with a result of triggering the second control component.

2. The method of claim 1, wherein a display area of displaying at least one first control component does not overlap with a display area of displaying the first image frame based on the first display data.

3. The method of claim 2, wherein in response to the first display data and the second display data being the same display data, displaying the first image frame based on the first display data further includes:
- separating a control component and the image in the image frame corresponding to the display data; and
- displaying the image.

4. The method of claim 1, wherein obtaining the display data includes:
- obtaining the display data of a display image of the second electronic device in real-time based on a connection channel with the second electronic device.

5. The method of claim 1, wherein determining the output method includes:
- obtaining configuration information of the second electronic device based on a connection channel with the second electronic device;
- in response to the configuration information indicating that the second electronic device receives inputs based on input gestures, determining the first output method as the output method; and
- in response to the configuration information indicating that the second electronic device receives inputs based on a control component, determining the second output method as the output method.

6. The method of claim 1, further comprising:
- determining an input corresponding to the first control component based on a trigger signal for the first control component; and
- responding to the input corresponding to the first control component to update the currently displayed first image frame; or
- determining an input corresponding to the second control component based on a trigger signal for the second control component; and
- responding to the input corresponding to the second control component to update the currently displayed second image frame.

7. The method of claim 6, wherein:
- a trigger signal for the first control component is generated by a click operation of the first control component; and
- responding to the input corresponding to the first control component to update the currently displayed first image frame includes: transmitting the input corresponding to the first control component through a connection channel with the second electronic device; or
- a trigger signal for the second control component is an input coordinate and an input operation received through the input device; and
- determining the input corresponding to the second control component based on a trigger signal for the second control component includes: converting the input coordinate into a conversion coordinate of a display area of the second image frame displayed based on the second display data; transmitting the conversion coordinate and the input operation through the connection channel with the second electronic device, the second electronic device determining a click operation for the second control component based on the conversion coordinate and the input operation to determine the input corresponding to the second control component; and
- responding to the input corresponding to the second control component to update a currently displayed second image frame includes: responding to the input corresponding to the second control component to update the display image of the second electronic device.

8. The method of claim 1, wherein after determining the output method, obtaining the display data when displaying based on the determined output method until the second electronic device is outside a connection range.

9. An electronic device, comprising:
- a screen;
- a processor; and
- a memory storing a computer executable instruction that, when executed by the processor, causes the processor to:
  - receive, by the electronic device, display data from a second electronic device, the display data corresponding to an image frame and being dynamically updated;
  - determine an output method; and
  - display the image frame based on the determined output method and the display data on the electronic device, wherein:
    - in response to the output method being a first output method, displaying at least a first control component and displaying a first image frame based on first display data; and
    - in response to the output method being a second output method, displaying a second image frame based on second display data, and the second image frame includes at least a second control component, a result of triggering the first control component being consistent with a result of triggering the second control component.

* * * * *